United States Patent
Bae et al.

(10) Patent No.: US 8,130,741 B2
(45) Date of Patent: Mar. 6, 2012

(54) METHOD FOR RESOURCE ALLOCATION WITH RECTANGULAR BURSTS

(75) Inventors: Junjik Bae, Evanston, IL (US); Aik Chindapol, Princeton, NJ (US); Jimmy Chui, Princeton, NJ (US); Vladimir Marchenko, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1216 days.

(21) Appl. No.: 11/830,979

(22) Filed: Jul. 31, 2007

(65) Prior Publication Data

US 2008/0031190 A1    Feb. 7, 2008

Related U.S. Application Data

(60) Provisional application No. 60/835,529, filed on Aug. 4, 2006.

(51) Int. Cl.
*H04B 7/208* (2006.01)
(52) U.S. Cl. ............................................ 370/344
(58) Field of Classification Search .................. 370/343, 370/344, 349, 319, 208, 209, 474, 477, 476, 370/479, 203; 375/260; 455/101
See application file for complete search history.

(56) References Cited

U.S. PATENT DOCUMENTS 7,548,507 B2 * 6/2009 Pandoh et al. ................ 370/208
* cited by examiner

*Primary Examiner* — Chi Pham
*Assistant Examiner* — Alexander Boakye

(57) ABSTRACT

A method is provided for allocation downlink bursts in a data region of a OFDMA data system, such data region having along one axis thereof increasing logical sub channel numbers and along another axis thereof increasing OFDMA symbol numbers, and wherein the burst are allocated into rectangular shaped sub regions within the data region. In one embodiment, the method allocates the bursts into rectangular shaped sub regions of the data region with minimum unused sub regions within the data region. In one embodiment, the method creates and locates the data region with minimum unused slots at the lowest logical sub channel number and the lowest OFDMA symbol number. In another embodiment, the method allocates the bursts within a data region having the largest number of OFDMA symbol numbers and then reduces the OFDMA symbol numbers of the data region only when the data region with the smaller OFDMA symbol numbers has less number of unused slots.

30 Claims, 23 Drawing Sheets

METHOD FOR RESOURCE ALLOCATION WITH RECTANGULAR BURSTS

CROSS REFERENCE TO RELATED APPLICATION

This application claims priority from U.S. Provisional application Ser. No. 60/835,529 filed on Aug. 4, 2006 which is incorporated herein by reference.

TECHNICAL FIELD

This invention relates generally to resource allocation in Orthogonal Frequency Division Multiple Access (OFDMA) systems and more particularly to rectangular burst allocation in downlink (DL) sub-frames used in OFDMA systems. Still more particularly, the invention also relates to DL rectangular burst allocation methods in IEEE Std 802.16e OFDMA system.

BACKGROUND AND SUMMARY

As is known in the art, Orthogonal Frequency Division Multiple Access (OFDMA) is a multi-user version of the popular OFDM digital modulation scheme. Multiple access is achieved in OFDMA by assigning subsets of subcarriers to individual users. This allows simultaneous low data rate transmission from several users.

More particularly, FIG. 1 illustrates the OFDMA frame structure for a Time Division Duplex (TDD) implementation. Each frame is divided by downlink (DL) and uplink (UL) sub-frames with the separation of Transmit/Receive (TTG) and Receive/Transmit (RTG) Transition Gaps to avoid DL and UL transmission collisions, see "Mobile WiMAX—Part I: A Technical Overview and Performance Evaluation," WiMAX Forum, March 2006. The Media Access Control (MAC) data should be mapped to an OFDMA data region for DL and UL using the procedure described in the FIG. 2.

More particularly, the data region in a sub frame is a rectangular shaped region having along one dimension, for example a bottom or width dimension of the rectangle, OFDMA symbol number spanning over time and having along an orthogonal dimension, for example a vertical or height dimension of the rectangle, logical sub channel number spanning over frequency. Each burst is mapped into a sub region of the data region. Each burst has at least one slot. A slot is the minimum possible data allocation region and it requires one sub-channel in frequency and one symbol in time. For simplicity each dimension may be referenced by the term "units" without explicit mention of sub-channels or time symbols, as this distinction is only used when describing orientation of the sub frame's data region in the examples. A slot is thus a rectangular region with dimensions one unit in the width dimension and one unit in the height dimension.

The UL mapping consists of two steps and is quite straightforward, see IEEE Std 802.16e, IEEE Standard for Local and Metropolitan Area Networks, Part 16: Air Interface for Fixed and Mobile Broadband Wireless Access System, 2005 incorporated herein by reference. First, the data region in the UL sub-frame is selected for each burst. The first slot of the data region starts from the next slot of the last occupied slot and the selection is continued such that the OFDMA symbol index is increased. When the edge of the UL zone is reached, it is continued from the lowest numbered OFDMA symbol in the next available sub-channel. Once the slots are selected for the data region, the burst is mapped. The burst mapping within the UL allocation starts from the lowest numbered sub-channel in the lowest numbered OFDMA symbol and is continued such that the sub-channel index is increased.

More particularly, the UL burst allocation is well defined in 802.16e OFDMA standard and there is no need to further optimize the performance, see IEEE Std 802.16, IEEE Standard for Local and metropolitan area networks, Part 16: Air Interface for Fixed Broadband Wireless Access Systems, 2004 and IEEE Std 802.16e, IEEE Standard for Local and metropolitan area networks, Part 16: Air Interface for Fixed and Mobile Broadband Wireless Access System, 2005.

On the contrary, the burst allocation problem in the DL sub-frame is a very challenging problem and it affects MAC performance of 802.16e OFDMA significantly. Here again, each down link sub frame includes a rectangular shaped data region having along one dimension, for example a bottom or width dimension of the rectangle, OFDMA symbol number in time and having along an orthogonal; dimension, for example a vertical or height dimension of the rectangle, logical sub channel number in frequency. Further, the DL-burst for data transmission requires a certain integer number of slots and it is mapped into a sub region of the data region that contains more slots than (or an equal number of slots to) the number of slots required by the burst. As noted above, a slot is the minimum possible data allocation unit. For example, in FIGS. 1-2, a slot is defined in IEEE 802.16 as one sub-channel in frequency and two OFDMA symbols in time in the DL sub-frame, and similarly a slot is defined as one sub-channel in frequency and three OFDMA symbols in time in the UL subframe. For simplicity in description, henceforth we shall consider a slot to be one sub-channel in frequency and one symbol in time. The allocated region for the burst is defined as a rectangular shaped sub region in a DL sub-frame since each Information Element (IE) for the burst in the DL-MAP contains symbol offset, sub-channel offset, number of symbols, and number of sub-channels, all of which are integer-valued. The sub region must be large enough to contain the burst. Otherwise the burst cannot be mapped into the sub region. The DL burst allocation problem is, therefore, the pre-allocation problem of the rectangular regions with integer dimensions in the DL sub-frame without overlapping. It should be noted that the burst must retain a rectangular shape (i.e., one dimension of the rectangle being OFDMA symbol number and another dimension of the rectangle being logical sub channel number), with each dimension having integer values, when allocated into the rectangular data region of the downlink sub frame.

There are two kinds of wasted slots in the DL burst allocation. Since the allocated sub region for the burst can be larger than the burst, there may be unused slots within this sub region. In addition, there are unallocated slots in the DL sub-frame because the rectangular shapes of the sub regions may not fill the sub-frame in its entirety. These wasted slots reduce the DL throughput and should be minimized. The optimal solution which minimizes the number of wasted slots and puts as many data bursts as possible in the sub-frame is not known to our best knowledge since it is a Nondeterministic Polynomial-time hard (NP-hard) problem.

Therefore, the DL-burst allocation is complicated because the data region for the burst is a two-dimensional allocation of a group of contiguous sub-channels in frequency, in a group of contiguous OFDMA symbols in time. This allocation may be visualized as a rectangle shown in FIG. 1 and requires a method, to solve how to allocate the data region within the sub-frame efficiently. Otherwise this allocation with a rectangle might degrade MAC throughput performance by generating too many wasted slots.

The DL-rectangular shaped burst allocation problem is, therefore, to allocate the data region within the DL sub-frame while minimizing the number of wasted slots. There are two kinds of wasted slots in the burst allocation as shown in FIG. 3. The total number of slots available in the rectangular allocated region for a burst should be more than (or equal to) the size of the burst and there might be unused slots within this allocated region. Another type of wasted slot is the unallocated slot. After the sub regions are mapped for all bursts into the sub-frame, there are some slots left in the sub-frame outside the sub regions. There exist these unallocated slots because either there are no more bursts to allocate or there are not enough slots left for another burst. These unallocated slots might be scattered in the DL sub-frame depending on the mapping method.

The optimal solution, which minimizes the total number of wasted slots while allocating as many bursts as possible, is not known (it is NP-hard). Instead of looking for the optimal solution, three methods in accordance with the inventions are provided based on myopic local optimization; one is referred to herein as a Bottom-Left (BL) method, a second one is referred to herein as a Large-Bottom-Priority (LBP) method; and the third is referred to herein as a Best-Fit (BF) level method. For a given burst, these three methods generate potential sub regions in the DL sub-frame, chooses a sub region that gives the minimum number of unused slots, and allocates the burst into this chosen sub region. If a burst cannot fit into the remaining unallocated slots, the method skips this burst and proceeds to the next burst. The method continues until the list of bursts is exhausted. These methods generally allocate the data region from the bottom-left (the first symbol) to the top-right (the last symbol). For BL and LBP, unallocated slots are at the top of the sub-frame and there are no unallocated slots in the middle. For BF, unallocated slots may appear in the middle of the sub-frame.

In accordance with the invention, a method is provided for allocating bursts into a region. The method includes: performing, for each one of the bursts, a series of trial mappings and determining the number of unused slots for each one of the trial mapping; and mapping, for each one of the bursts, a selected one of the trial mappings with the minimum number of unused slots into an unallocated portion of the region.

In one embodiment, the region is rectangular and wherein the mapping commences in a corner of the region.

In one embodiment, the method includes packing by choosing a location at a first corner of the region, attempting to place a burst using different sizes along one axis of the region, and choosing the largest one of the sizes having the minimum number of slots.

In one embodiment, if no placement is possible at a given corner because no valid trial mappings exist, the method proceeds to another corner of the region.

In one embodiment, the method includes packing by choosing a first size along an axis of the region in which the burst of that first size has at least one valid placement in the data region. In one embodiment, the method includes packing by choosing dimensions of the burst, from largest size along the first axis to smallest size along the first axis and terminating the trial mappings once the number of unused slots increases with a smaller size along the first axis.

In one embodiment, the trial mappings selection is in accordance with the minimum number of unused slots.

In one embodiment, the data region comprises a plurality of contiguous rectangular strips, each one of the strips having the same predetermined number of slots and wherein each one of the sub regions is made up of a portion of one or more contiguous ones of the strips and wherein the method places the burst in the narrowest one of the sub regions.

In one embodiment, the method includes constructing horizontal strips in the region and wherein the method finds trial mappings for each one of the horizontal strips and selects the trial mapping resulting in the minimum number of unused slots.

In one embodiment a method is provided for allocating bursts into sub regions of a fixed dimension data region. The method includes: determining, for each one of the bursts, potential positions and dimensions for the sub regions within the data region for allocation of the burst; and, selecting, for each one of the bursts, one of the potential sub regions resulting in the minimum number of unused slots for such one of the bursts.

In one embodiment, a method is provided for allocation downlink bursts in a data region of a OFDMA data system, e.g., an IEEE 802.16 data system, such data region having along one axis thereof increasing logical sub channel numbers and along another axis thereof increasing OFDMA symbol numbers, and wherein the burst are allocated into rectangular shaped sub regions within the data region.

In one embodiment, a method is provided for allocating downlink bursts into a data region of an OFDMA data system, such data region having along one axis thereof increasing logical sub channel numbers and along another axis thereof increasing OFDMA symbol numbers. The method includes mapping each one of the bursts into slots of a corresponding one of a plurality of contiguous rectangular shaped sub regions of the data region with each one of the sub regions having a minimum number of unused slots.

In one embodiment, the data region comprises a plurality of contiguous rectangular strips, each one of the strips having the same predetermined number of slots and wherein each one of the sub regions is made up of a portion of one or more contiguous ones of the strips.

In one embodiment, the mapping commences with a first one of the bursts being mapped at a corner of the data region.

In one embodiment, the corner is at the lowest logical sub channel number and the lowest OFDMA symbol number.

In one embodiment, a method is provided for allocating downlink bursts in a data region of an OFDMA data system, such data region having along one axis thereof increasing logical sub channel numbers and along another axis thereof increasing OFDMA symbol numbers. The method includes: dividing the data region into a plurality of contiguous rectangular strips along one of the axis with each one of the strips having the same predetermined number of slots; performing, for each one of the bursts, a series of trial mappings of such one of the bursts into a one or more of the contiguous vertical strips and determining the number of unused slots for each one of the trial mapping; and mapping such one of the bursts into slots of the one or more of the vertical strips having the minimum number of unused slots.

In one embodiment, when there are more than one trial mappings resulting in the minimum number of unused slots, the method maps the burst across the one of the trial mapping requiring the largest number of vertical strips.

In one embodiment, the method allocates the bursts into rectangular shaped sub regions of the data region with minimum unused sub regions within the data region. In one embodiment, the method creates and locates the data region with minimum unused slots at the lowest logical sub channel number and the lowest OFDMA symbol number.

In another embodiment, the method allocates the bursts within a data region having the largest size along one of the axes and then reduces the size along such axis only when the sub region with the smaller size along such axis has less number of unused slots.

In one embodiment a method is provided for allocating bursts into sub regions of a fixed dimension data region. The method includes: performing, for each one of the bursts, a series of trial mappings within levels within the region; performing, for each one of the bursts, a series of trial mappings creating a new level within the region; and mapping, for each one of the burst, a selected one of the trial mappings with the minimum number of unused slots into an unallocated portion of the data region. In one embodiment, the selected one of the trial mappings may be changed by fixing the length along one dimension and reducing the length along the other dimension.

In one embodiment, when there are more than one trial mappings resulting in the minimum number of unused slots, the method maps the burst across one of the trial mappings minimizing the remaining width within an existing level.

In one embodiment, when there are more than one trial mappings resulting in the minimum amount of remaining width in the level, the method maps the burst across one of the trial mappings with the least level height.

In one embodiment, when the current burst has no potential sub regions within any level, the method rearranges all previously-placed trial mappings by sorting the trial mappings within each level of the region in accordance with changes in height within the levels, and the method further sorts the trial allocations between levels of the region in accordance with the amount of used width for each level;

In one embodiment, the method performs trial allocations of the remaining bursts in accordance with the result of the sortings, and selecting, for each one of the remaining bursts, one of the potential sub regions resulting in the minimum number of unused slots for such one of the bursts.

In accordance with the invention, three heuristic methods are provided: the Bottom-Left (BL) method, the Large-Bottom-Priority (LBP) method, and the Best Fit level method referred above. The BL method allocates the data region at the bottom left point while minimizing the number of unused slots within the data region. That is, the basic idea of the BL is to allocate the data region at the bottom left point (lowest logical sub channel number and lowest OFDMA symbol) while minimizing the number of unused slots within the data region. The LBP method, on the other hand, operates by maintaining the largest bottom size available for future bursts, by also attempting to use smaller and smaller bottom sizes for the current burst, while keeping the number of unused slots for the burst minimized. The BF method packs bursts by using the concept of levels, or constant-height horizontal strips. Each burst is either packed into an existing level, or is placed into a new level. The heights of the levels are calculated dynamically depending on the input bursts, as well as on their order. None of these methods require any pre-defined vertical strips (i.e., vertical strips are defined by the number of slots along the horizontal direction; each vertical strip contains a certain number of slots along the horizontal direction and all slots along the vertical direction) beforehand and can handle the large bursts effectively.

Thus in accordance with one feature of the invention, a method is provided for allocation downlink bursts in a data region of a OFDMA data system, such data region having along one axis thereof increasing logical sub channel numbers and along another axis thereof increasing OFDMA symbol numbers, such method comprising: creating and locating the data region with minimum unused slots at the lowest logical sub channel number and the lowest OFDMA symbol number.

In accordance with another feature of the invention, a method for allocation downlink bursts in a data region of a OFDMA data system is provided, such data region having along one axis thereof increasing logical sub channel numbers and along another axis thereof increasing OFDMA symbol numbers. The method includes allocating the bursts within a data region having the largest size along one of the axes and then reduces the size along such one of the axes only when the data region with the smaller size along such one of the axes has less number of unused slots.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

General

Figure 1:
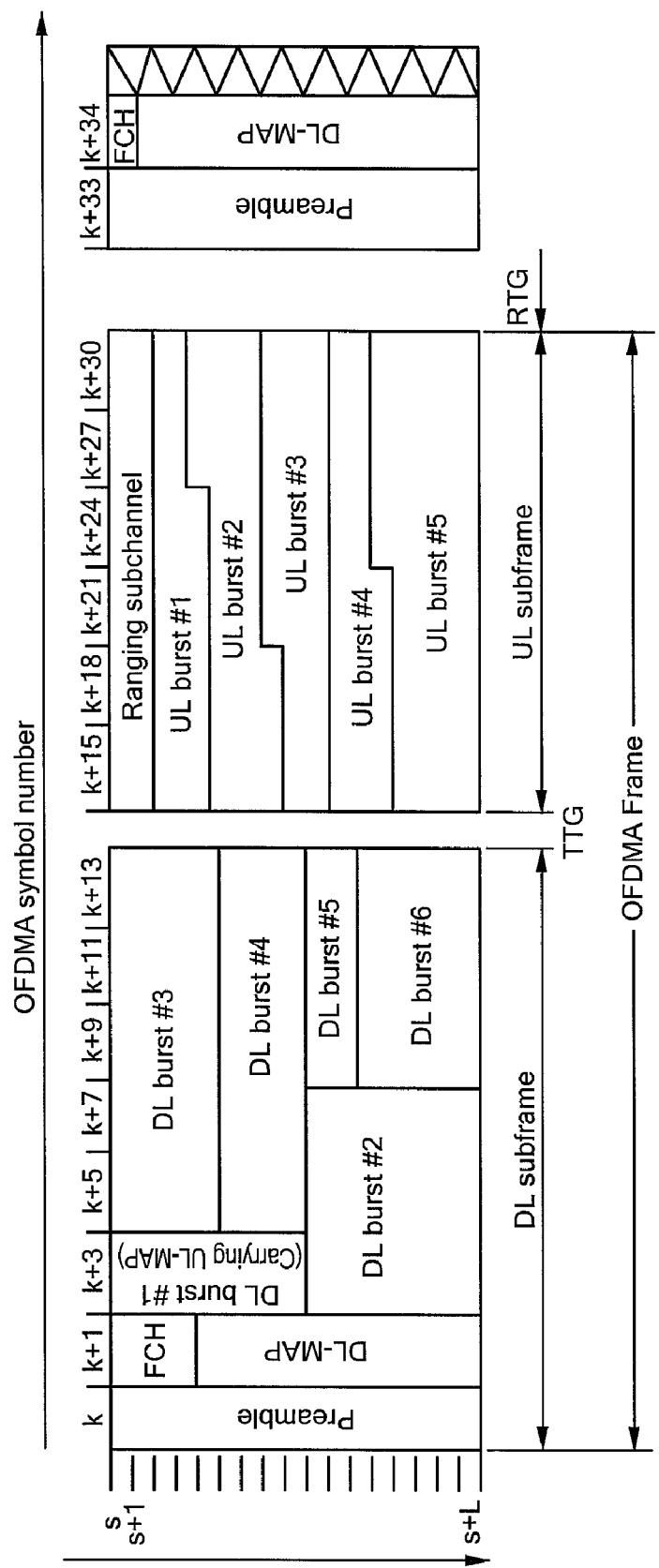
FIG. 1 is a OFDMA frame structure for TDD implementation.

The BL and LBP methods begin to allocate the data region from the bottom (the first symbol) to the top (the last symbol). Unallocated slots are at the top of the sub-frame and there are no unallocated slots in the middle. The BF method includes three stages. During the first stage, the method packs from left to right within horizontal strips, or levels. During the second stage, the method sorts the packed bursts twice; once within each level, and once amongst the levels. During the last stage, the method packs the remaining bursts using a variation of BL to be described. The BF method does not necessarily pack from bottom to top during any of these stages, and the resultant packings may have unallocated slots in the middle of the DL subframe. One advantage of these three methods (i.e., BL, LBP, BF) is that they work no matter the size of the incoming bursts, whether there are vertical strips or not. The absence of vertical strips is considered equivalent to the case of using vertical strips with strip size width 1. Therefore, the largest burst size that can be handled is limited by the sub-frame size. For these methods (i.e., BL, LBP, BF), it is also possible to force the location of the first packet, instead of having the method decide its placement, as long as the bottom-left corner of the forced placement corresponds to the bottom-left corner of the given rectangular data region. This ability is important for applications such as the resource allocation problem for WiMAX due to the placement of frame header information, namely the Frame Control Header, the downlink map, the uplink map, and any other bursts that require placement at the start of the frame.

One benefit of these methods is that bursts are placed in the given burst order; no sorting of bursts is necessary. This is important especially in scenarios where the burst order dictates priority preference.

The rectangular data region allocation in the DL sub-frame is similar to the strip packing and bin packing problems, see E. Hopper and B. C. H. Turton, "An Empirical Investigation of Meta-heuristic and Heuristic Algorithms for a 2D Packing Problem," *European Journal of Operational Research* 128, 1, pp. 34-57, 2000, and N. Lesh, J. Marks, A. McMahon, and M. Mitzenmacher, "New Heuristic and Interactive Approaches to 2D Rectangular Strip Packing," ACM Journal of Experimental Algorithmics, Vol. 10, pp. 1-18, 2005, and B. S. Baker, E. G. Coffman, R. L. Rivest, "Orthogonal Packings in Two Dimensions," SIAM J. Computing, Vol. 9, No. 4, November 1980, and "Survey on two-dimensional packing," available online at http://www.csc.liv.ac.uk/~epa/surveyhtml.html (Jul. 24, 2007), and references therein. However, the fundamental difference between the rectangular data region allocation problem and the strip packing and bin packing problems is that the allocated burst regions do not have preset dimensions; they must be determined by the packing method. The approaches for the bin packing and strip packing problems cannot be applied directly to the burst packing problem due to this fundamental difference.

Figure 2:
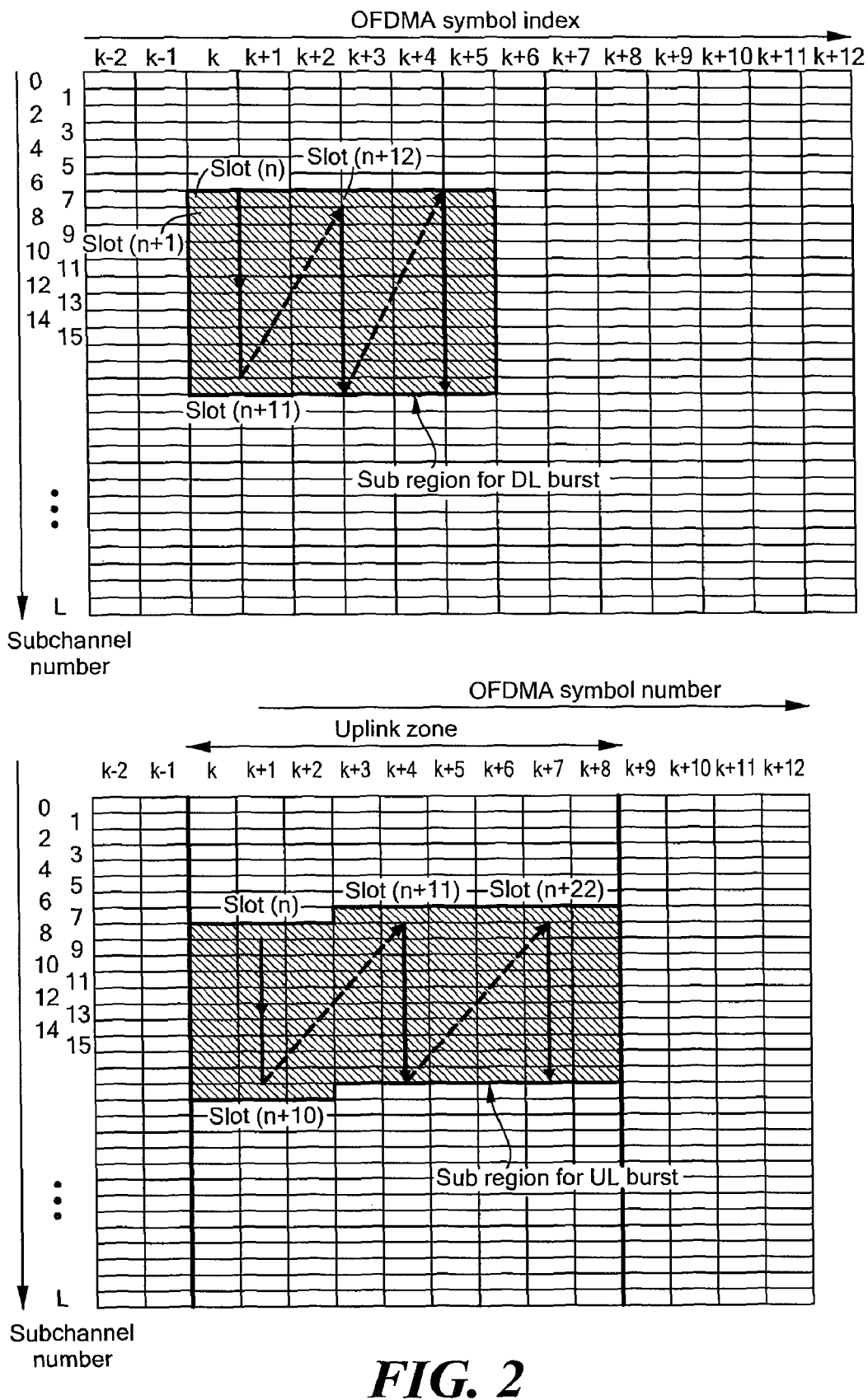
FIG. 2 are examples of mapping OFDMA slots to subchannels and symbols in the down-link (in Partial Usage of Sub Channels (PUSC) mode) and in the up-link.
Figure 3:
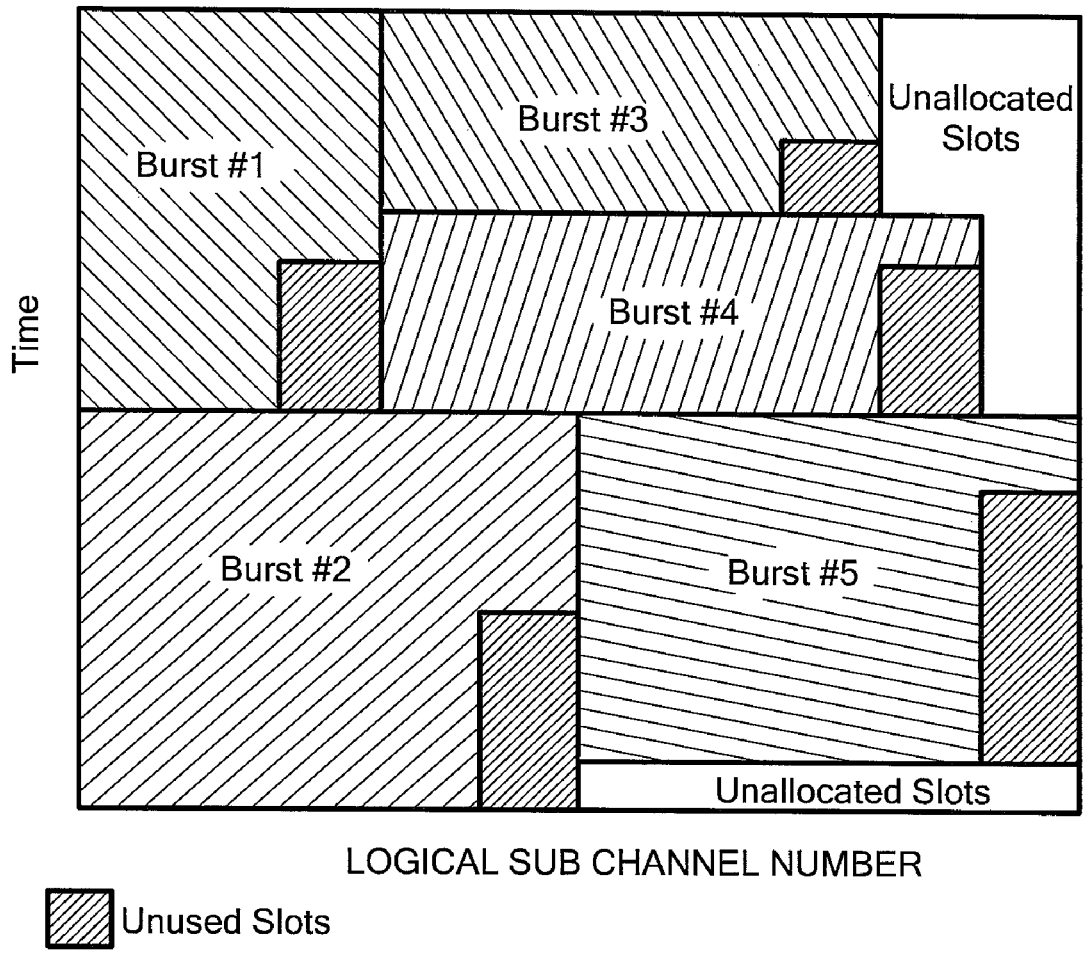
FIG. 3 shows Wasted Slots in the DL burst allocation with unused slots within data region and unallocated slots after allocation is finished.

It should be noted that FIGS. 1-3 depict the frame or subframe with the horizontal axis being time and the vertical axis being sub channel number. It should also be noted that FIGS. 5, 7-9, and 11 depict the subframe or data region with the horizontal axis being sub channel number and the vertical axis being time. The choice of orientation is only used for illustrative purposes in the examples; the packing algorithms do not require a particular orientation. Unused slots in these figures are only representative and do not necessarily represent the exact location of unused slots as determined by the base station.

For simplicity each dimension may be referenced by the term "units" without explicit mention of sub-channels or time symbols, as this distinction is only used when describing orientation of the sub frame's data region in the examples. A slot is thus a rectangular region with dimensions one unit in the width dimension and one unit in the height dimension.

Bottom-Left (BL)

Figure 5:
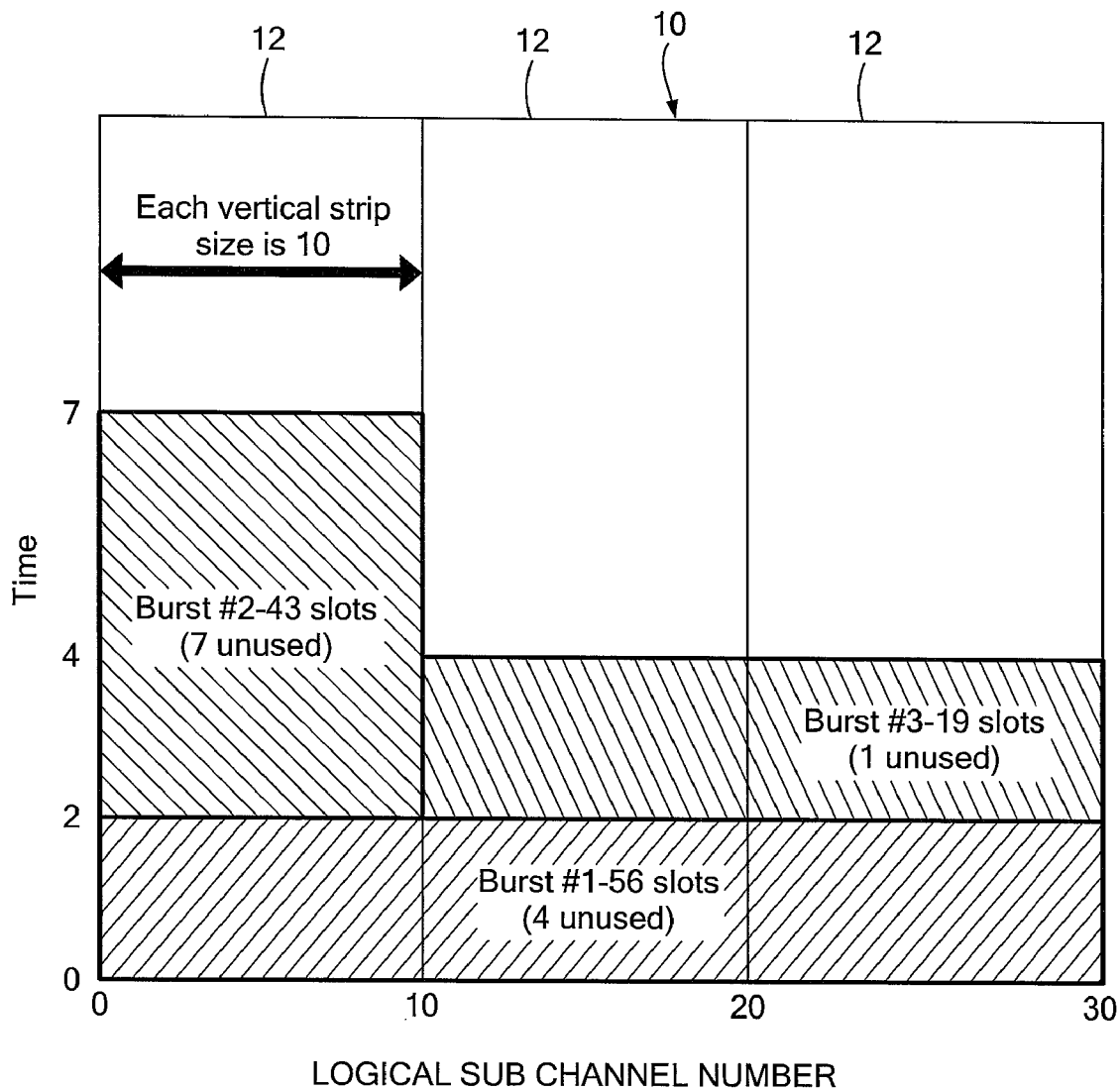
FIG. 5 is an example of Burst Allocation using Bottom-Left method of FIG. 4.

Referring now to FIG. 5, an example of a data region using the Bottom-Left method for Burst Allocation is shown. The horizontal, or here bottom, axis of the data region 10 is frequency or sub-channel number and the vertical axis is time or OFDMA symbol index number.

As shown therein, there is a plurality of contiguous vertical strips 12 along the time axis in the data region. Each one of the vertical strips is a bundle of contiguous logical sub channel numbers. Each vertical strip contains a certain number of contiguous logical sub-channels in frequency and all DL symbols in time. For BL, each one of the strips has a pre-specified width, and in this example, each one of the strips has the same width. For example, if the DL sub-frame consists of 30 sub-channels and 20 OFDMA symbols, this represents 30 vertical units and 20 horizontal units respectively. The vertical strip with size 10 contains 10 sub-channels and 20 symbols, and the total number of slots within the vertical strip is 200 (i.e., 10×20). The bottom sizes available for sub regions in the data region when the vertical strips are used are total widths of one or more contiguous vertical strips. In this example, when a vertical strip size 10 is used, the bottom size for sub regions in the data region can be one of the following sizes, 10, 20, and 30.

More particularly, the method allocates downlink bursts into a data region of an OFDMA data system, such data region having along a vertical axis thereof increasing logical sub channel numbers and along a bottom axis thereof increasing OFDMA symbol numbers. The method comprises mapping each one of the bursts into slots of a corresponding one of a plurality of contiguous rectangular shaped sub regions of the data region with each one of the sub regions having a minimum number of unused slots.

Still more particularly, the data region comprises a plurality of contiguous rectangular strips, each one of the strips having the same predetermined number of slots and each one of the sub regions being made up of a portion of one or more contiguous subset of the vertical strips. The mapping commences with a first one of the bursts being mapped at a corner of the data region, here the corner is at the lowest logical sub channel number and the lowest OFDMA symbol number.

Still more particularly, the method performs, for each one of the bursts, a series of trial mappings of such one of the bursts into a one or more of the contiguous vertical strips and determining the number of unused slots for each one of the trial mapping and then maps such one of the bursts into slots of the one or more of the vertical strips having the minimum number of unused slots.

For example, consider that a first burst requires allocation of 56 slots into a first rectangular sub region of the data region, a second burst requires allocation of 43 slots into a second rectangular sub region contiguous to the first sub region and a third burst requires allocation of 19 slots into a third rectangular sub region contiguous to the second sub region.

First, the data region divided into a plurality of, here for example, 3, contiguous rectangular strips along one of the axis, here along the sub-channel number or bottom axis, with each one of the strips having the same width, here, for example, 10 units per strip in the direction of the bottom axis.

The mapping commences with the first one of the bursts being mapped at corner of the data region, here the corner is at the lowest logical sub channel number and the lowest OFDMA symbol number, i.e., the bottom left (BL) of the data region. In a first of a series of trial mappings of the first burst into a one or more of the contiguous vertical strips, the number of unused slots is determined if such first one of the burst were to be mapped into one vertical strip. Thus, if the first burst with 56 slots were to be mapped into only one vertical strip, which has width 10, there would be 4 unused slots. In a second of the series of trial mappings, the number of unused slots is determined if such first one of the burst were to be mapped into two contiguous vertical strips. Thus, if the first burst with 56 slots were to be mapped into two contiguous vertical strips, which have a combined width of 20, there would also be 4 unused slots. In a third of the series of trial mappings, the number of unused slots is determined if such first one of the burst were to be mapped into three contiguous vertical strips. Thus, if the first burst with 56 slots were to be mapped into three contiguous vertical strips, which have a combined width of 30, there would also be 4 unused slots. In accordance with the method, when more than one trial mappings results in an equal number of minimum number of unused slots, the method maps the burst across the one of the trial mapping requiring the largest number of vertical strips. Thus, in this example, the first burst is mapped into three contiguous vertical strips along the bottom of the data region.

In a first of a series of trial mappings of the second burst into a one or more of the contiguous vertical strips, the number of unused slots is determined if such second one of the burst were to be mapped into one vertical strip. Thus, if the second burst with 43 slots were to be mapped into only one vertical strip there would be 7 unused slots. In a second of the series of trial mappings, the number of unused slots is determined if such second one of the burst were to be mapped into two contiguous vertical strips. Thus, if the second burst with 43 slots were to be mapped into two contiguous vertical strips there would also be 17 unused slots. In a third of the series of trial mappings, the number of unused slots is determined if such second one of the burst were to be mapped into three contiguous vertical strips. Thus, if the second burst with 56 slots were to be mapped into three contiguous vertical strips there would also be 17 unused slots. In accordance with the method, the method maps the second burst into slots of the one vertical strip since such mapping results in the minimum number of unused slots.

In a first of a series of trial mappings of the third burst into a one or more of the contiguous vertical strips, the number of unused slots is determined if such third one of the burst were to be mapped into one vertical strip. Thus, if the third burst with 19 slots were to be mapped into only one vertical strip there would be 1 unused slot. In a second of the series of trial mappings, the number of unused slots is determined if such third one of the bursts were to be mapped into two contiguous vertical strips. Thus, if the second burst with 19 slots were to be mapped into two contiguous vertical strips there would also be 1 unused slot. In accordance with the method, when more than one trial mappings results in an equal number of minimum number of unused slots, the method maps the burst across the one of the trial mapping requiring the largest number of vertical strips. Thus, in this example, the third burst is mapped into two contiguous vertical strips.

The Bottom-Left (BL) method for the resource allocation problem is similar to the Bottom-Left method for the strip packing and bin packing problems. More particularly, both methods find the bottom left point to for rectangle placement, see N. Lesh, J. Marks, A. McMahon, and M. Mitzenmacher, "New Heuristic and Interactive Approaches to 2D Rectangular Strip Packing," ACM Journal of Experimental Algorithmics, Vol. 10, pp. 1-18, 2005. In the strip packing problem, the dimensions of the rectangle are given and fixed, and possibly allows for rotations, see F. K. Miyazawa and Y. Wakabayashi, "Packing problems with orthogonal rotations," Proceedings of the 6th Latin American Theoretical Informatics Symposium (LATIN 2004), LNCS 2976, pp. 359-368, 2004, and K. Jansen and R. van Stee, "On Strip Packing With Rotations," STOC 2005, pp. 755-761, May 2005. With the BL method according to the invention, the dimensions of the rectangle are not given and must be chosen; they are determined by examining all possible data regions with different bottom sizes. Among them, the data region which generates the largest bottom size with the minimum number of unused slots for a given burst is chosen and located in the sub-frame.

In the example above, the DL sub-frame was divided into 3 vertical strips and the number of sub-channels in a vertical strip is 10. Therefore, the possible bottom sizes of the data region in this example are 10, 20, or 30. There are three bursts that should be located in the sub-frame. The first burst size requires 56 slots. The bottom left point for this burst is (0,0) and total number of unused slots in the data region is 4 for all possible bottom sizes. Therefore, the method chooses the data region with the largest bottom size for the burst. Next burst needs 43 slots. The bottom left point is (0,2). The number of unused slots with the bottom size 10 is 7, and is 17 with the bottom size 20 or 30. Therefore, the data region with the bottom size 10 is chosen and located at (0,2). The third burst requires 19 slots. The possible bottom sizes for this burst are 10 and 20 at the bottom left point (10,2). The data region with the bottom size 30 is not available. The method chooses the data region with the bottom size 20.

More particularly, the BL method allocates bursts within a data region as follows:
1. Determines the bottom-left point where to place the next burst;
2. Calculates the unused slots for all possible bottom lengths; if there are two or more data regions with the same unused slots, the method selects a data region with the largest bottom length;
3. The method chooses the data region which gives the smallest number of unused slots; if no data region is possible for a given burst, then the method moves to the next BL point and the methods recurs to 2;
4. The method moves to the next burst and returns to 1;
5. The method calculates the wasted (i.e., unused plus unallocated) slots.

The method described above may be modified with the following: If the data region for a burst gives the smallest number of unused slots with all sub-channels in use, then the method allocates the data region at the bottom and moves all previously allocated data regions correspondingly.

Figure 4:
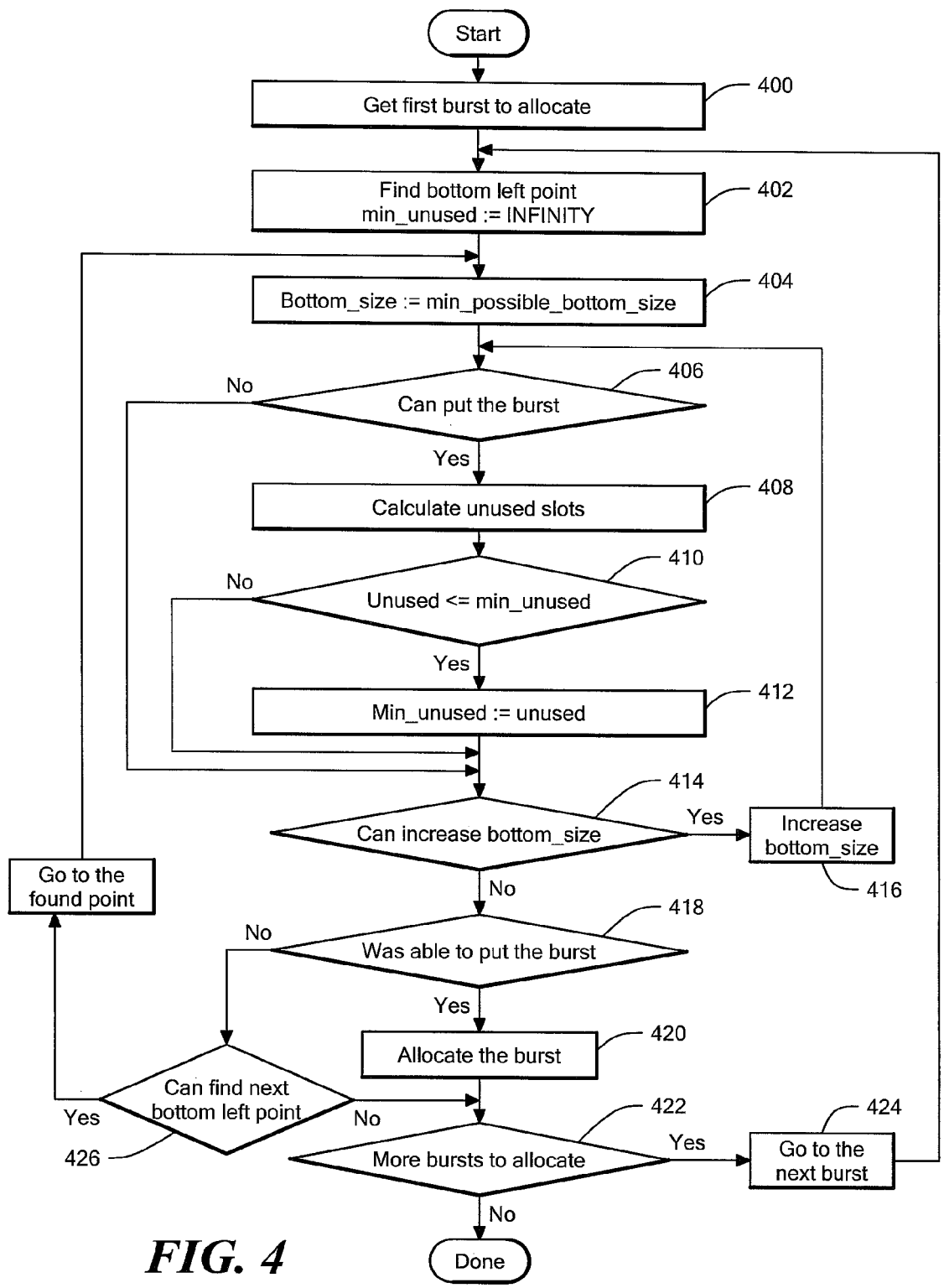
FIG. 4 is a flowchart of a Bottom Left (BL) burst allocation method in accordance with the invention.

Referring to FIG. 4 a more detailed flow chart of the BL methods is shown. The method obtains the first burst (step 400). Next, the method determines the bottom left point (i.e., the lowest logical sub channel number and lowest symbol index) in the data region (Step 402). The method then determines the bottom size (i.e., the number of symbol indices) for the burst (Step 404) and determines whether the burst can be allocated to the data region (Step 406). If it can, calculate the number of unused slots in the data region (Step 408). The method determines whether the number of unused slots is less than or equal to the current minimum number of unused slots (Step 410). If the number of unused slots is less than or equal to the current minimum number of unused slots, the current minimum unused slots (min_unused) is set equal to the number of unused slots (unused) (Step 412) and the method determines whether the bottom can be increased (Step 414). (It should be noted that if in Step 406 the burst could not be allocated or if in Step 410 the number of unused slots is not less than or equal to the current minimum number of unused slots, the method proceeds to Step 414). If Step 414 determines that the bottom can be increased, the bottom size is increased (Step 416) and the method returns to Step 406 to determine whether the burst can be allocated. On the other hand, if in Step 414 it is determined that the bottom cannot be increased, the method determines whether the burst was able to be allocated to the data region (Step 18). If allocated, the burst is allocated to the data region (Step 420) and the method determines whether there are more burst to allocate (Step 422). If there are more bursts to allocate, the process obtains the next burst (Step 424) and returns to Step 402; on the other hand, if there are no more bursts to allocate, the method is completed. On the other hand, if in Step 418 it was determined that the burst was not able to be allocated, the method determines whether it can find the next bottom left point (Step 428). If it cannot, the method proceeds to Step 422 to determine whether there are more bursts to allocate. If, on the other hand, in Step 428 it determined that the next bottom left point can be found, the method proceeds to the found point and returns to Step 404.

Figure 5A:
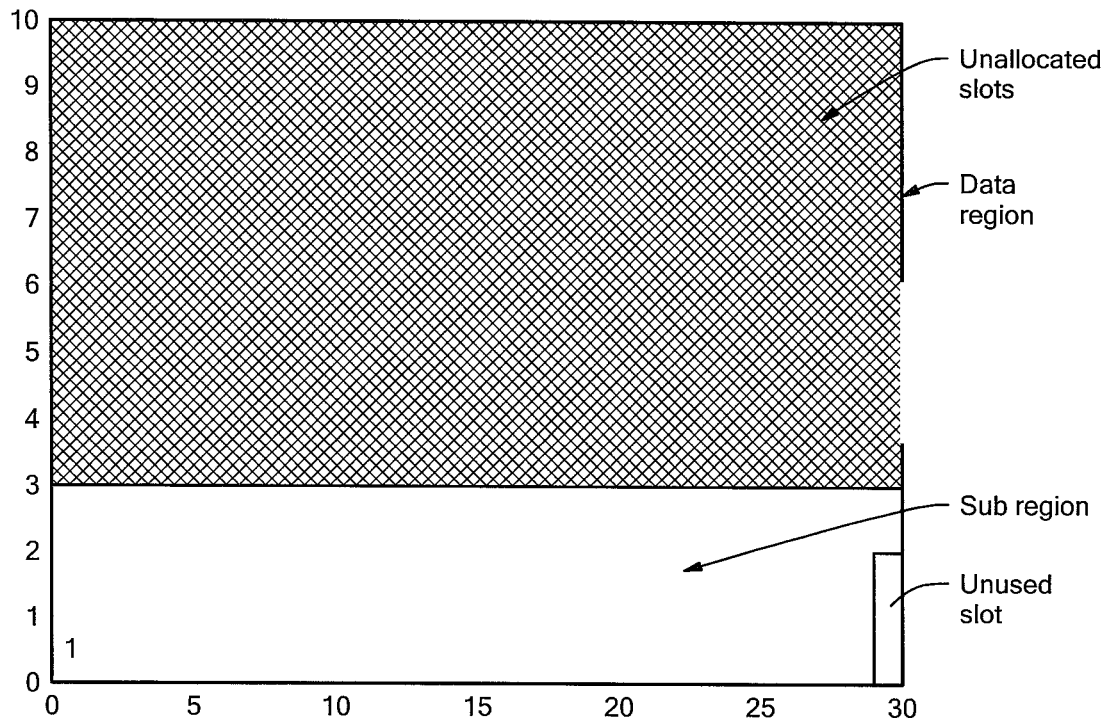
FIGS. 5A-5D are other examples of Burst Allocation using Bottom-Left method of FIG. 4.
Figure 5B:
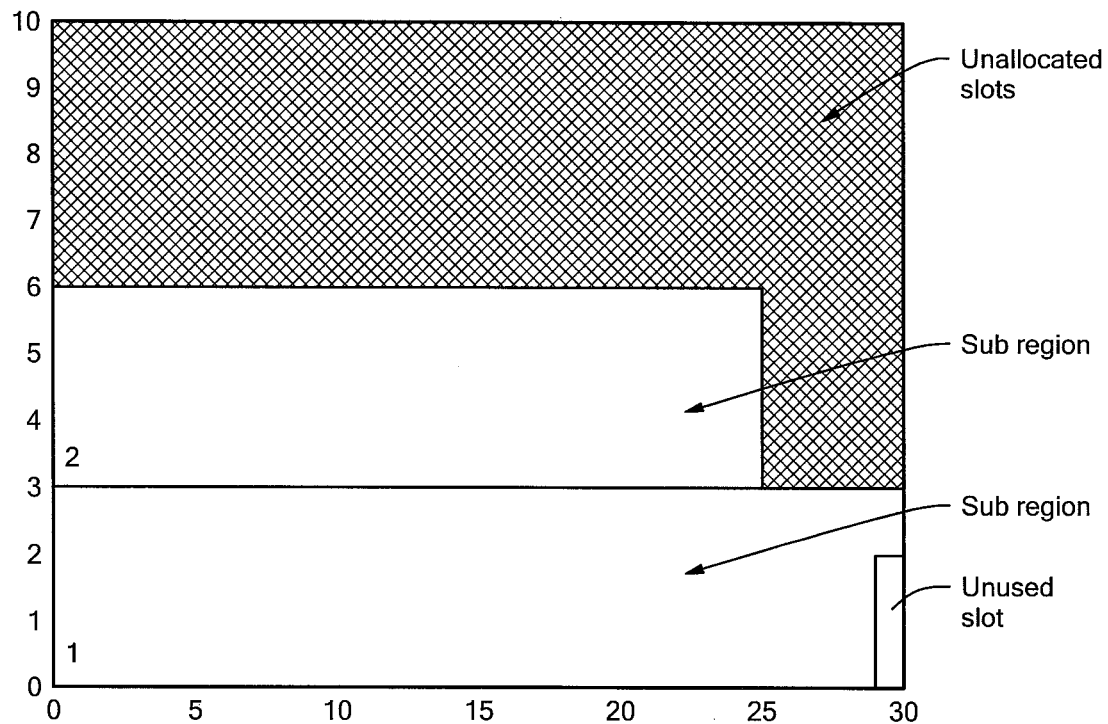
Figure 5C:
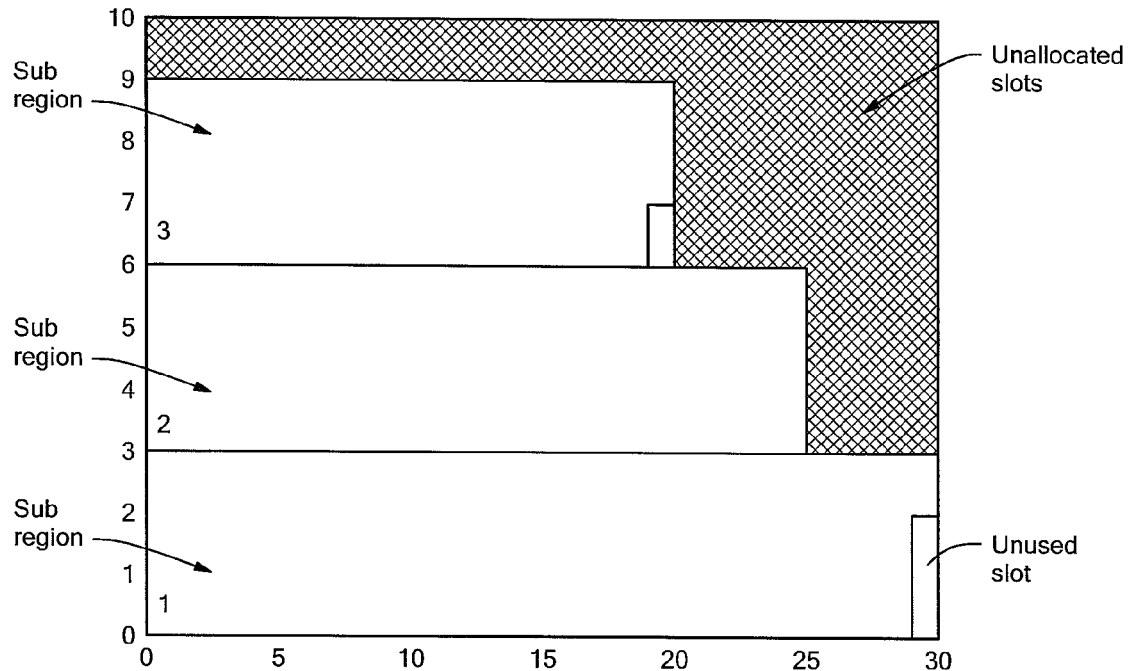
Figure 5D:
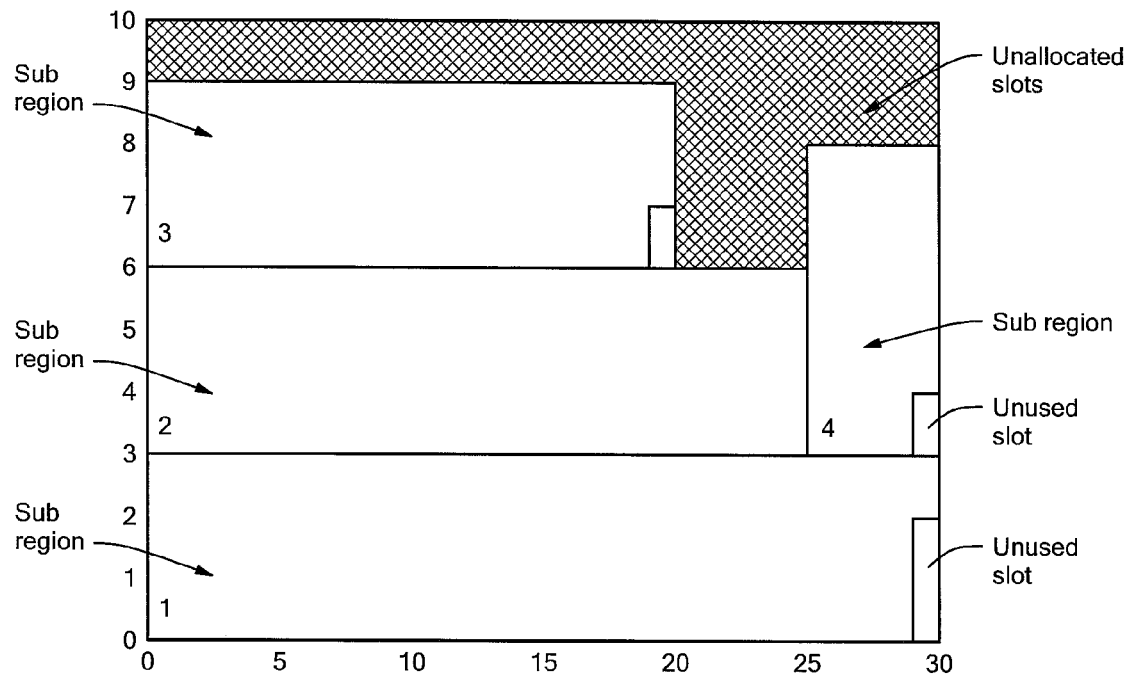

As a second example, the BL method is applied to a smaller rectangle with width 30 and height 10, for bursts of size 88, 75, 59, 24, and 26, in that order, as shown in FIG. 5A. Here the strip size is 5, thus creating 6 vertical strips. At the start of the method, there is only one bottom-left point, at (0,0). The possible bottom sizes are 5, 10, 15, 20, 25, and 30. The bottom sizes that produce the least amount of unused slots are 10, 15, and 30, all of which produce an unused slot total of 2, given the first burst requiring size 88. Note that the value of 5 does not appear in this list because it would produce a rectangle with width 5 and height 18 which is too tall, that is, the burst does not fit (the maximum available height is 10). The chosen bottom size is the largest of these values, namely 30, as shown in FIG. 5A. The second burst has a size of 75 slots. For this burst, the only bottom-left point is at (0,3). This has possible bottom sizes of 5, 10, 15, 20, 25, and 30. The bottom sizes of 15 and 25 yield placements requiring zero unused slots. Thus the block is placed with a base length of 25 (the largest of the two), as shown in FIG. 5B. The third burst has a size of 59 slots. The first bottom-left point is at (25,3), and the maximum bottom size for this point is 5. The only available bottom size for this point is 5, corresponding to one contiguous vertical strip. At this point, the maximum available height is 7, and thus cannot accommodate the 59 slots of the burst. Thus the method moves on to the next bottom-left point, at (0,6). This has possible bottom sizes of 5, 10, 15, 20, and 25. The bottom sizes of 15 and 20 yield burst placements requiring the minimum number of unused slots, namely 1 in this case. Thus the burst is placed with a base length of 20, as shown in FIG. 5C. The fourth burst, having size 24, is placed at (25,3) with a bottom size of 5, as shown in FIG. 5D. The fifth burst has size 26. The first bottom-left corner is (20,6), which has maximum bottom size 5 and an available height of 4. The second bottom-left corner is (25,8), which has maximum bottom size 5 and an available height of 2. The third (and last) bottom-left corner is (0,9), which has maximum bottom size 20, and an available height of 1. None of these bottom-left points can accommodate a burst having a size of 26, hence the fifth burst is not placed.

It should be noted that the possible values of bottom size is dependent on the particular bottom-left corner in consideration as well as the pre-specified widths of the vertical strips. In these examples, all pre-specified widths of the vertical strips were equal, and so the possible bottom sizes were always a multiple of this vertical strip width.

BL Variation: Aggressive Bottom-Left

The aggressive bottom-left method expands the definition of 'bottom-left corner' and 'maximum bottom size'. A bottom-left corner can be any point in the data region as long as it lies on a vertical strip boundary or the left-most boundary of the data region, and the slot immediately to its upper-right direction is unallocated. Its associated maximum bottom size is not limited by previously placed bursts, unlike the (non-aggressive) BL method. That is, the bottom size may yield burst placements that result in unallocated space occurring in the middle of the data region. Furthermore, it allows for non-rectangular grids to be filled in as well. The same flowchart as in FIG. 4 is followed with the new definitions of bottom-left corner and maximum bottom size: bottom-left corners do not need to touch corners of already-placed bursts, and the maximum bottom size is not limited to the top of already-placed bursts.

As an example, the method will pack a data region of width 30 and height 10 using bursts of size 88, 75, 59, 24, and 26, in that order. In this example, the method uses equal vertical strip sizes of 5, thus creating 6 vertical strips to cover the width 30 of the given data region. The first two bursts are placed identically to the (non-aggressive) BL method. This is due to both bursts being placed at the same bottom-left points, and the maximum bottom sizes are both 30 using both methods.

The third burst has a size of 59. The first bottom-left point is at (25,3), and has a maximum bottom size of 5. As before, the burst will not fit with this bottom-left corner. The second bottom-left point is at (0,6). Unlike the (non-aggressive) BL method, the maximum bottom size here is 30 (not 25). The possible bottom sizes are 5, 10, 15, 20, 25, and 30. The bottom sizes of 15, 20, and 30 yield allowable burst placements with 1 unused slot (the minimum amount). Thus the third block is placed as in FIG. 8A.

The fourth burst has a size of 24. The first bottom-left point is (25,3), and has a maximum bottom size of 5. It only has an available height of 3, due to the placement of Burst 3. Thus the burst does not fit here. The second bottom-left corner is (0,8), and has maximum bottom size 30. The possible bottom sizes are 5, 10, 15, 20, 25, and 30. Thus the method determines that the burst is placed with a bottom-size of 25: it produces the minimum number of unused slots out of the valid bottom sizes, as in FIG. 8B.

The fifth burst has a size of 26. The first two bottom-left points are (25,3) and (25,8), both having maximum bottom size of 5. The burst does not fit with these bottom-left corners, due to the lack of available height at these points. However, the burst does fit at the next bottom-left corner, namely at (0,9). The burst requires a bottom length of 30, thus yielding the final packing as in FIG. 8C. Note that when bursts 4 and 5 are being placed, the 'gap' created by Burst 3, between (25,3) and (30,6), is not neglected. Thus if there was a 6th burst that had a size less than or equal to 15, it would be placed with a bottom-left corner of (25,3).

As a second example for the aggressive bottom-left BL method, the method examines the packing process for a non-rectangular region. Namely, the method tries to place a burst in a region where certain slots are unavailable for packing. This may be the case if previously-assigned bursts. Consider the given region of FIG. 9A, where the method tries to place a burst of slot size 10. For simplicity, the method considers an equal strip size of 1 for all vertical strips. The first bottom-left corner is at (1,0). The method cycles through all possible bottom sizes: 1, 2, 3, 4. For each bottom size, the available heights are, respectively, 3, 2, 2, and 2. This accommodates bursts of size 3, 4, 6, and 8, respectively, which are all too small to fit the given burst. The second bottom-left corner is at (2,0). Again, the method cycles through all possible bottom sizes: 1, 2, and 3. Similar to the first bottom-left corner, this accommodates only bursts up to size 2, 4, and 6 respectively, and thus the given burst cannot be placed. The third corner to try is at (3,0). Only two bottom lengths are available: 1 and 2. But for each of these bottom lengths, the available height is 5. Thus the burst of size 10 fits, by choosing a bottom length of 2 (the required height is thus 5.) See FIG. 9B for its placement. Note that this method does have an increased complexity. However, it has the advantage that it can pack bursts into arbitrary regions (and not just rectangular regions). This makes this method is particularly useful for further 'second-round' packing, after a first packing attempt using a more time-efficient method. A further variant of this method is used in the Best-Fit method to be described.

Large-Bottom-Priority (LBP)

Figure 6:
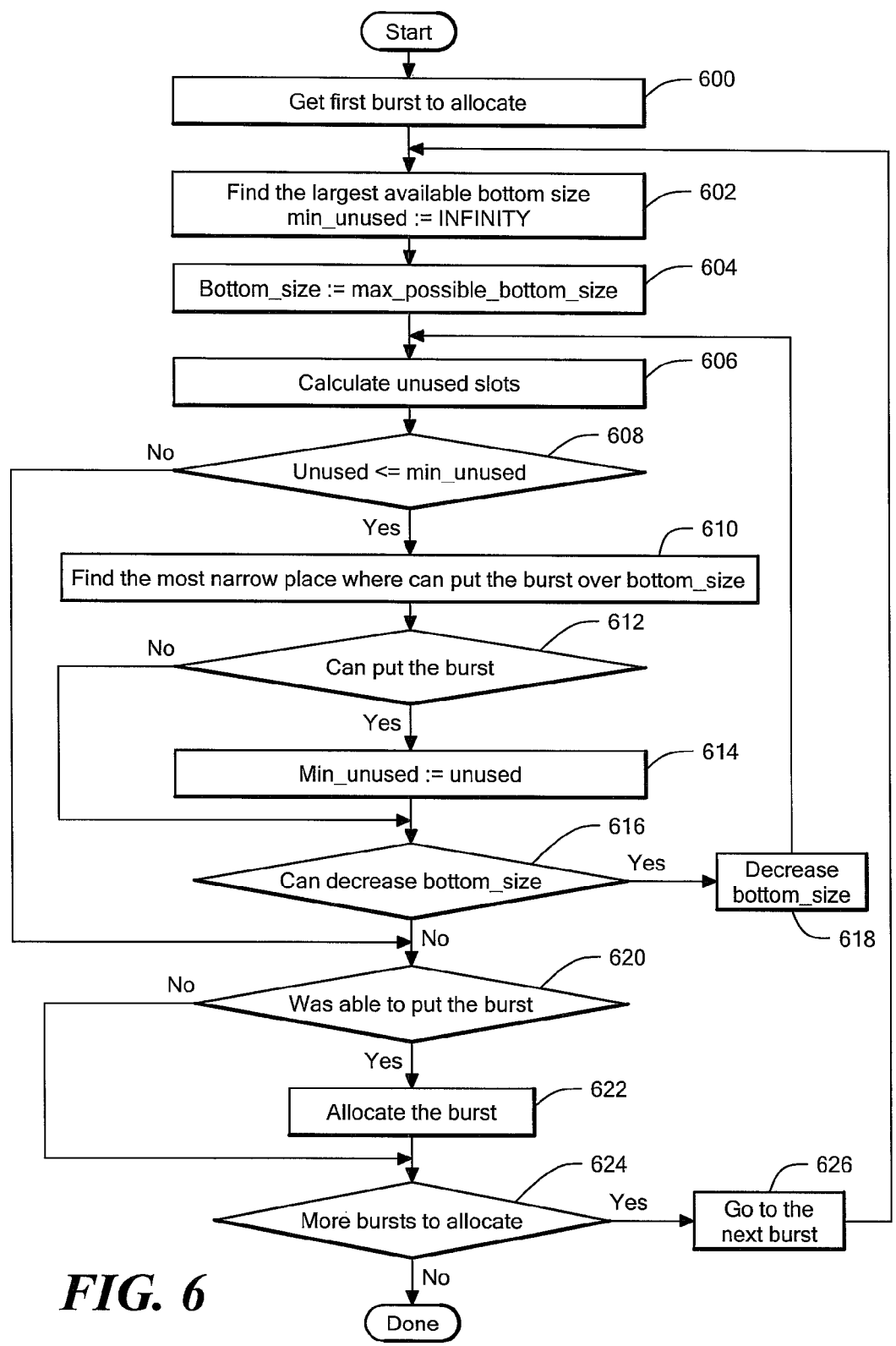
FIG. 6 is a flow chart of a Large-Bottom-Priority (LBP) Burst Allocation method according to the invention.

The LBP method considers the data region with the largest possible bottom size first. Only when the number of the unused slots with the smaller bottom size is less than (or equal to) the number of unused slots with the larger one, it reduces the bottom size of the data region for a given burst. This method also considers only the unused slots when it allocates the burst. FIG. 6 shows the details of the method and the FIG. 7 explains how the LBP method operates. This method requires that the widths of the vertical strips are all equal. This fixes the possible bottom sizes to be multiples of the vertical strip width, with a maximum bottom size equal to the width of the data region.

With LBP the method allocates downlink bursts in a data region of a OFDMA data system, such data region having along a vertical axis thereof increasing OFDMA symbol numbers in terms of slot-time and along a bottom axis thereof increasing logical sub-channel numbers by allocating the bursts within a sub region of the data region having the largest number of sub-channels and then reducing the number of sub-channels of the data region only when the sub region data region with the smaller number of sub-channels has less number (or same number) of unused slots.

For example, consider that a first burst requires allocation of 27 slots into a first rectangular sub region of the data region, a second burst requires allocation of 18 slots into a second rectangular sub region contiguous to the first sub region and a third burst requires allocation of 34 slots into a third rectangular sub region contiguous to the second sub region.

First, the data region divided into as plurality of, here for example, 3, contiguous rectangular strips along one of the axis, here along the logical sub-channel or bottom axis, with each one of the strips having the same predetermined number of slots, here, for example, 10 slots.

The mapping commences with the first one of the bursts being mapped at corner of the data region, here the corner is at the lowest logical sub channel number and the lowest OFDMA symbol number, i.e., the bottom left (BL) of the data region. In a first of a series of trial mappings of the first burst into one or more of the contiguous vertical strips, the number of unused slots is determined if such first one of the burst were to be mapped into the largest number of contiguous vertical strips, in this case, 3 vertical strips, which results in a burst bottom size of 30. Thus, if the first burst with 27 slots were to be mapped into three vertical strips there would be 3 unused slots. In a second of the series of trial mappings, the number of unused slots is determined if such first one of the burst were to be mapped into two contiguous vertical strips, which results in a burst bottom size of 20. Thus, if the first burst with 27 slots were to be mapped into two contiguous vertical strips there would also be 13 unused slots. Because 13 is greater than 3, no more trial mappings are tested, and the last trial mapping with the minimum number of unused slots is chosen. In accordance with the method, because the last trial mapping yielded more unused slots than the second-last trial mapping, the method maps the burst according to the chosen mapping and places the burst on the narrowest region supporting the map. Thus, in this example, the first burst is mapped into three contiguous vertical strips along the bottoms of the data region.

In a first of a series of trial mappings of the second burst into a one or more of the contiguous vertical strips, the number of unused slots is determined if such second one of the burst were to be mapped into three contiguous vertical strips, which has width 30. Thus, if the second burst with 18 slots were to be mapped into only three contiguous vertical strips there would be 12 unused slots. In a second of the series of trial mappings, the number of unused slots is determined if such second one of the burst were to be mapped into two contiguous vertical strips, which has width 20. Thus, if the second burst with 18 slots were to be mapped into two contiguous vertical strips there would be 2 unused slots. In a third of the series of trial mappings, the number of unused slots is determined if such second one of the burst were to be mapped into only one vertical strip, which has width 10. Thus, if the second burst with 18 slots were to be mapped into one vertical strip there would also be 2 unused slots. In accordance with the method, all choices of contiguous vertical strips are exhausted and the method maps the burst with the last trial mapping resulting in the minimum number of unused slots. In this case, the method maps the burst using one vertical strip and places into the narrowest region supporting the burst.

Here, LBP method selects the sub data region with the smaller bottom size (one vertical strip (i.e., a strip of 10 units in this example) instead of two vertical strips (i.e., a strip of 20 units in this example)) when the numbers of unused slots are the same. The logic behind this decision is that the method would like to keep the largest bottom size for the next burst if possible. This is accomplished by placing the burst on top of the narrowest region that can fit the burst, thus leaving larger-width regions untouched and thus available for the next burst.

In a first of a series of trial mappings of the third burst into one or more of the contiguous vertical strips, the number of unused slots is determined if such third one of the burst were to be mapped into two contiguous vertical strips. Thus, if the third burst with 34 slots were to be mapped into two contiguous vertical strips there would be 6 unused slots. In a second of the series of trial mappings, the number of unused slots is determined if such third one of the bursts were to be mapped into only one vertical strip. Thus, if the second burst with 34 slots were to be mapped into only one vertical strip there would be 6 unused slots. In accordance with the method, when more than one trial mappings results in an equal number of minimum number of unused slots, the method maps the burst across the one of the trial mapping requiring the smallest number of vertical strips. Thus, in this example, the third burst is mapped into one contiguous vertical strip. The burst is placed on the narrowest region, in this case, on top of the second burst. That is, as noted above, when there are an equal number of unused slots, LBP always tries to keep the largest bottom by growing bursts vertically while BL always fills the bottom first.

For this third burst, the LBP method does not perform a trial mapping over three contiguous vertical strips because there is no available placement that supports a bottom length for a burst over three contiguous vertical strips.

Thus, briefly, the method:

1. Finds possible bottom lengths and sets the current length equal to the largest bottom; i.e., next=next largest bottom; if the vertical strip is used, then the possible bottom length is a multiple of the vertical strip size;

2. Calculates the unused slots for the current and next bottom length;

3. If the data region with the current bottom length gives more unused slots, then set current=next; next=next largest bottom and go to 2 above;

4. Locates the data region with the current bottom length. Then go to 1 above for the next burst.

5. Calculates the wasted (i.e., unused plus unallocated) slots.

Referring to FIG. 6, the LBP process is shown in more detail: The method obtains the first burst for allocation into a rectangular sub region of the data region (Step 600). Next, the method finds the largest available bottom size (min_unused=INFINITY), Step 602. Next, the method sets bottom_size=max_possible_bottom_size, Step 604. Next, the method calculates the number of unused slots, Step 606. Next, the method determines whether unused is less than or equal to min_unused, Step 608. If unused is less than or equal to min_unused, the method determines the most narrow place where the burst can be placed over the bottom_size, Step 610. Then the method determines whether it can allocate the burst. Step 612. If the burst can be allocated, the method sets min_unused equal to unused, Step 614. Next, the method determines whether it can decrease the bottom_size. Step 616. If it can, the method decreased the bottom_size (Step 618) and returns to Step 606. On the other hand, if it cannot decrease the bottom_size in Step 616, the method determines whether the burst was able to be allocated, Step 620. If it can be allocated, the burst is allocated, Step 622 and the method accepts more bursts for allocation, Step 624 and goes to the next burst Step 626 by returning to Step 602. If in Step 608 the method determines that unused is not less than or equal to min_unused, the method proceeds to Step 620. Also, if in Step 612, the method determines that it cannot allocate the burst, the method proceeds to Step 616.

Thus, in this example, the largest bottom size for the first burst which requires 27 slots is 30 and the number of unused slots with the bottom size 30 is 3. If the bottom size 20 is used for the data region, the number of the unused slots is 13. Therefore, the data region with the bottom size 30 is chosen and located at (0,0) according to the method. The next burst needs 18 slots and the number of unused slots with the bottom size 30, 20, and 10 are 12, 2, and 2 respectively. The data region with the bottom size 10 is chosen and located at (0,1). As can be seen here, the LBP method chooses the data region with the smaller bottom size (10 instead of 20) when the numbers of unused slots are the same. The logic behind this decision is that the method would like to keep the largest bottom size for the next burst if possible. The third burst needs 34 slots and the largest bottom size available is 20. Since the numbers of unused slots are the same no matter whether the bottom size is 20 or 10, the method chooses the data region with the bottom size 10 and locates it at (0,3) not (10,1). The same logic (keeping the largest bottom for the next burst if possible) is applied to locate the data region.

Considering now a second example, here filling in a rectangle of width 30 and height 10, with bursts of size 88, 75, 59, 24, and 26, in that order. The method uses a strip size of 5, thus creating 6 vertical strips.

The first burst has size 88 and the maximum available bottom size is 30. This bottom size leads to a burst with a height of 3 and 2 unused slots. When the method tries the next bottom size (25), the method requires a height of 4 but the number of unused slots increases to 12. Hence the method tries to place the burst using a burst of width 30 and height 3. This is placed at (0,0). The end result after this first packing is identical to that of the Bottom Left method, as seen in FIG. 5A.

The second burst has size 75, and the maximum bottom size is also 30. This bottom size leads to a burst with height 3 and 15 unused slots. When the method tries the next bottom size (25), the method requires a height of 3 and the number of unused slots reduces to 0. With a bottom size of (20), the method requires a height of 4, but the number of unused slots increases to 5. Thus the bottom size of 25 is chosen, and is placed at (0,3). Again, the end result after this packing is identical to that of the Bottom Left method, as seen in FIG. 5B.

Figure 7:
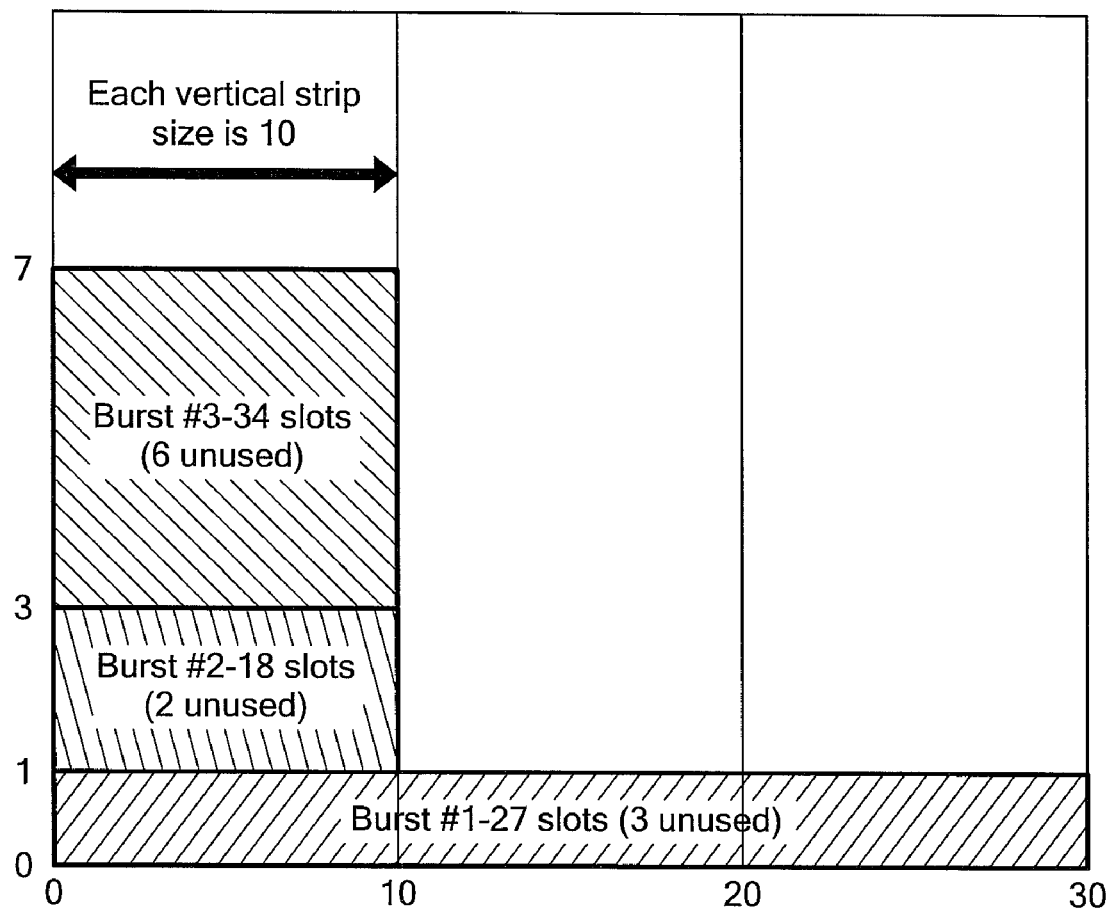
FIG. 7 is an example of Burst Allocation using the Large-Bottom-Priority method of FIG. 6.
Figure 7A:
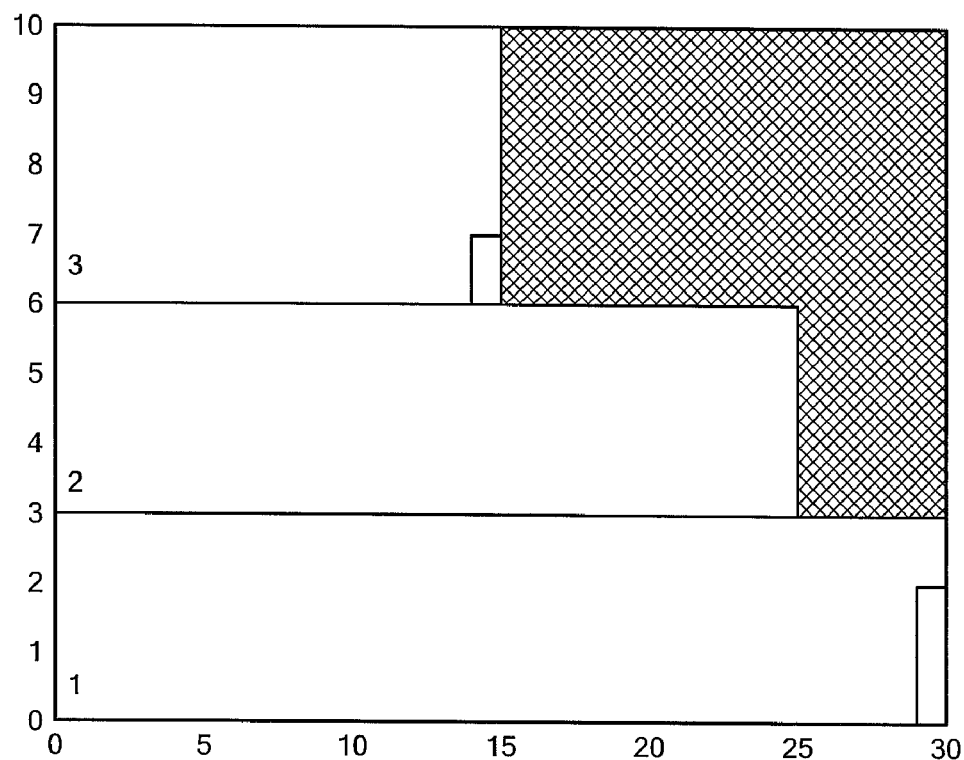
FIGS. 7A-7C are other examples of Burst Allocation using the Large-Bottom-Priority method of FIG. 6.

The third burst has size 59. In this case, the maximum bottom size is 25, which stretches from (0,6) to (25,6). When the method tries a bottom size of 25, the method requires a height of 3, and the number of unused slots is 16. With a bottom size of 20, the burst requires a height of 3, and the number of unused slots is 1. With a bottom size of 15, the burst requires a height of 4, but the number of unused slots remains at 1. When the bottom size is 10, the burst requires a height of 6, with 1 unused slot. However, there is no room for a burst of this size. When the bottom size is 5, the burst requires a height of 12, and the number of unused slots remains at 1. Again there is no room for a burst of this size. Thus the best placement for the burst at (0,6) with a rectangle with height dimension 4 and bottom length 15. This results in a different packing to that seen in the Bottom Left method, FIG. 7A shows the packing at this point.

Figure 7B:
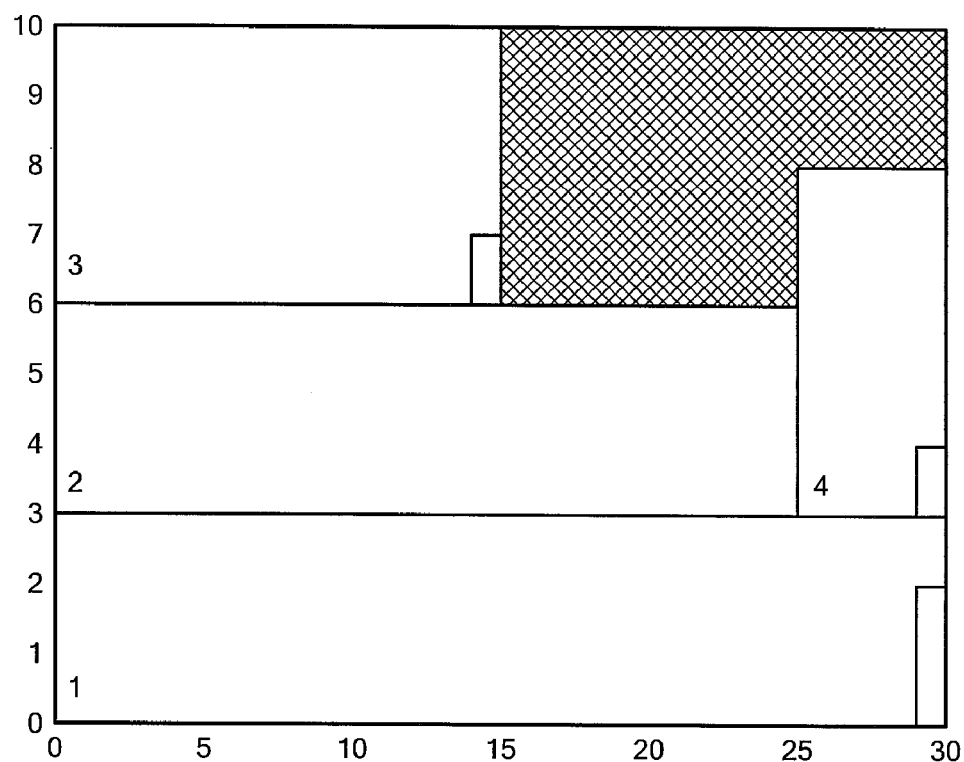

The fourth burst has size 24. From FIG. 7A, it can be seen that there is a maximum bottom size of 10, which spans from (15,6) to (25,6). Using a bottom size of 10 results in a burst with height 3, with 6 unused slots. Testing a bottom size of 5 results in a burst with height 5, with 1 unused slot. Thus the latter is chosen. The location chosen is (25,3), which is the narrowest place. See FIG. 7B.

Figure 7C:
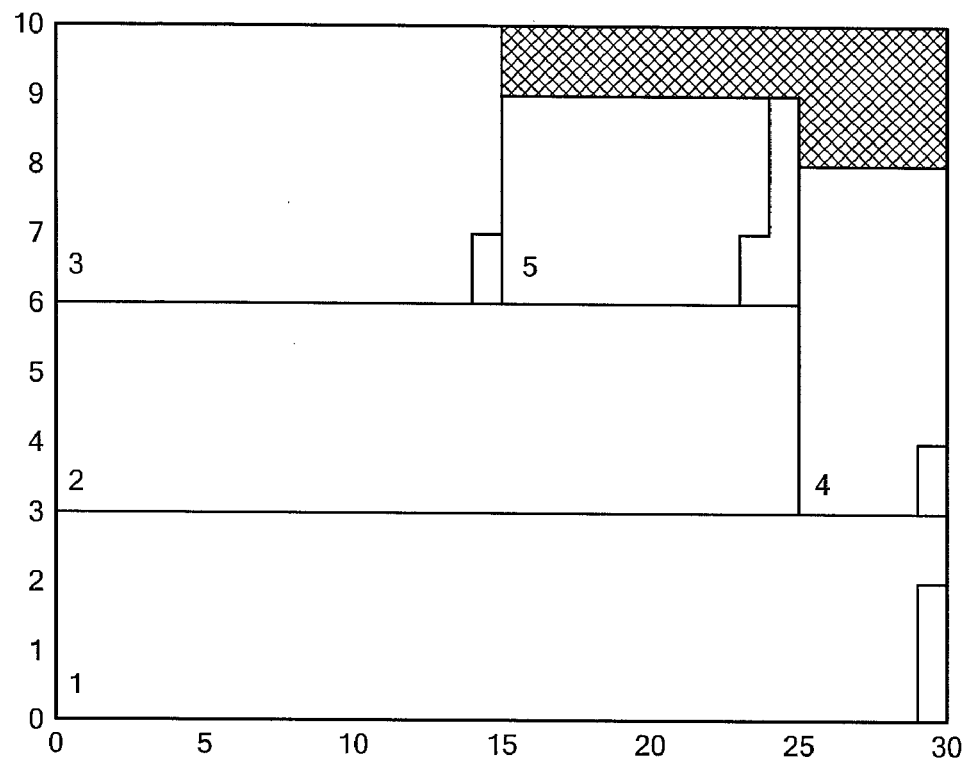
Figure 8A:
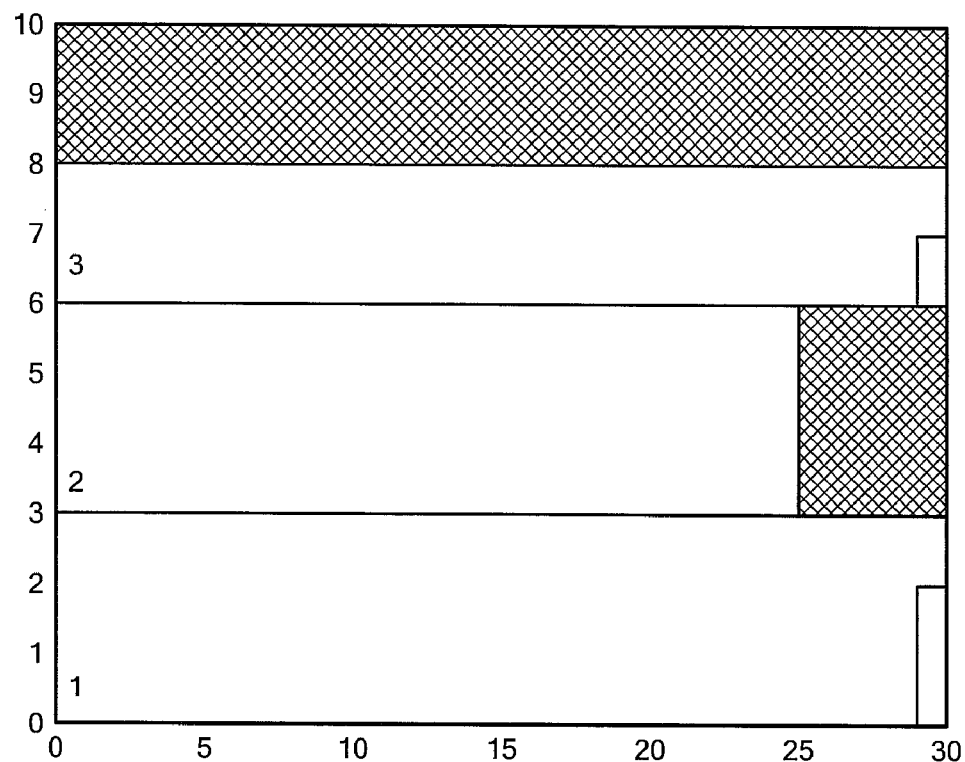
FIGS. 8A-8C are examples of a variation of BL according to the invention.
Figure 8B:
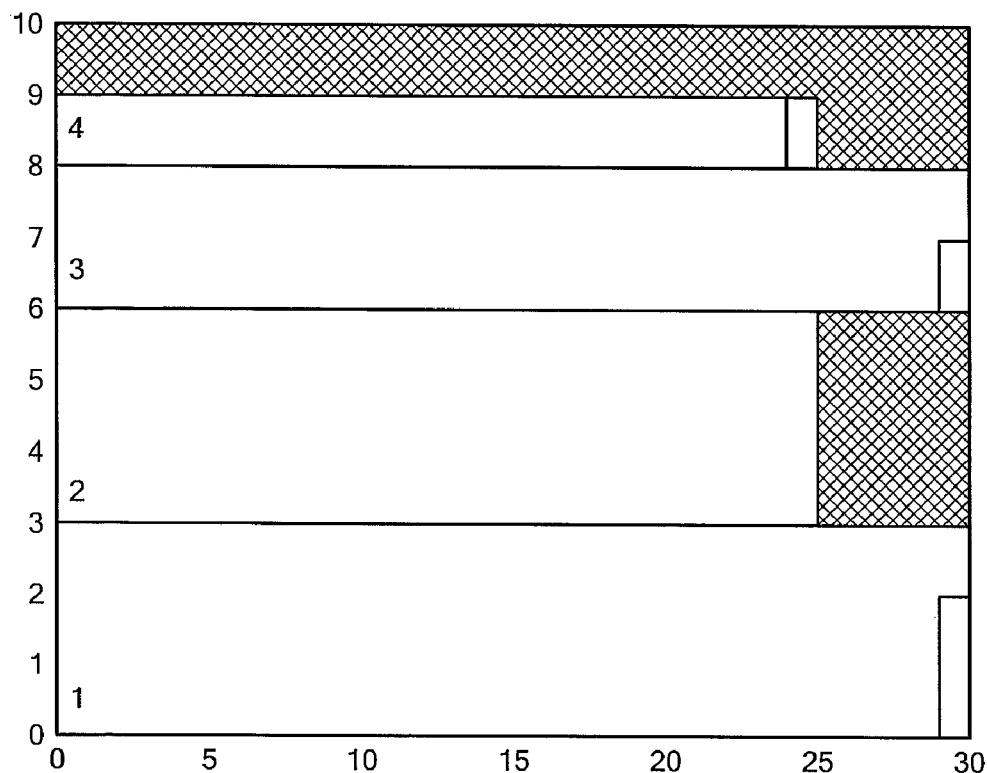
Figure 8C:
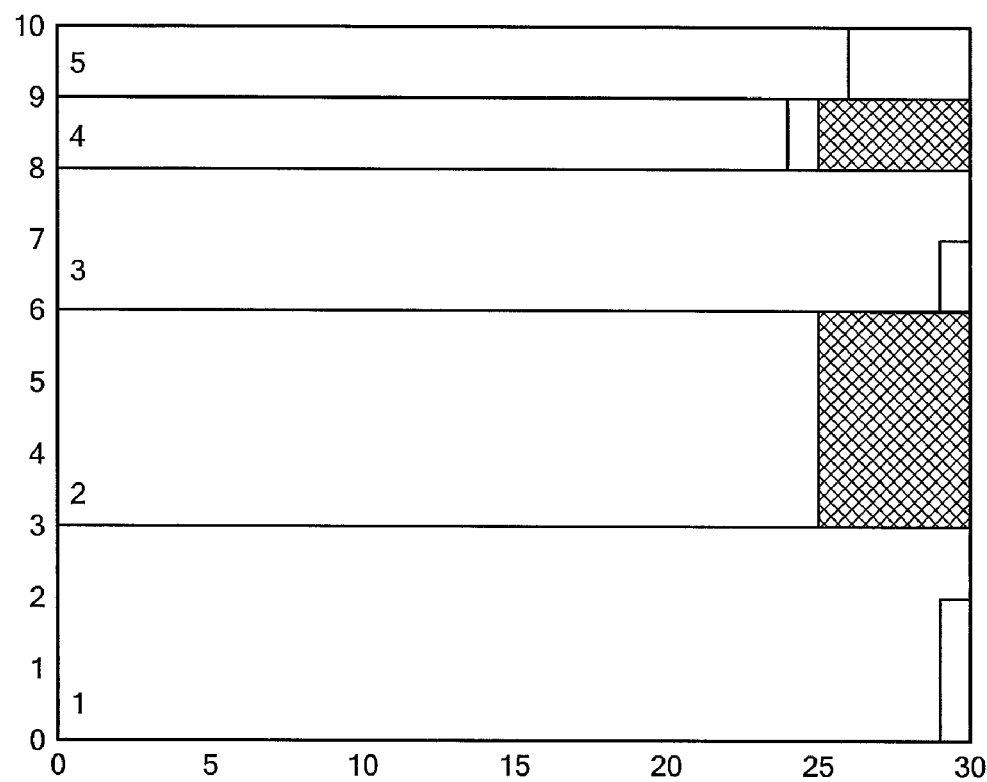
Figure 9A:
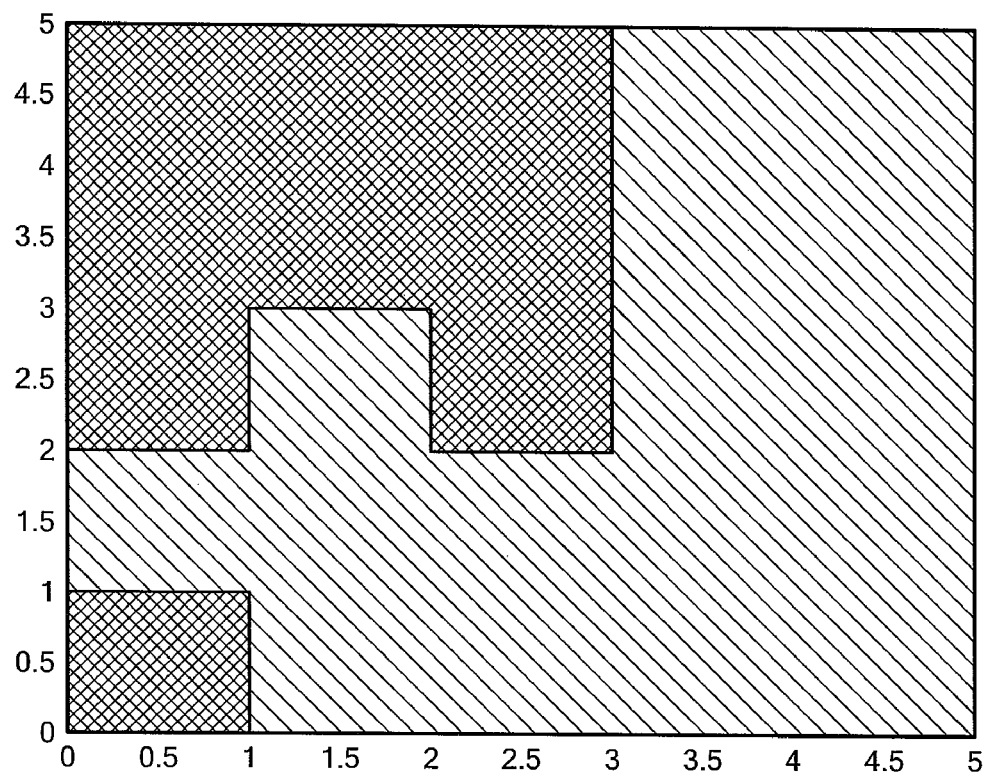
FIG. 9A-9B are examples of how the variation of BL can accommodate non-rectangular data regions.
Figure 9B:
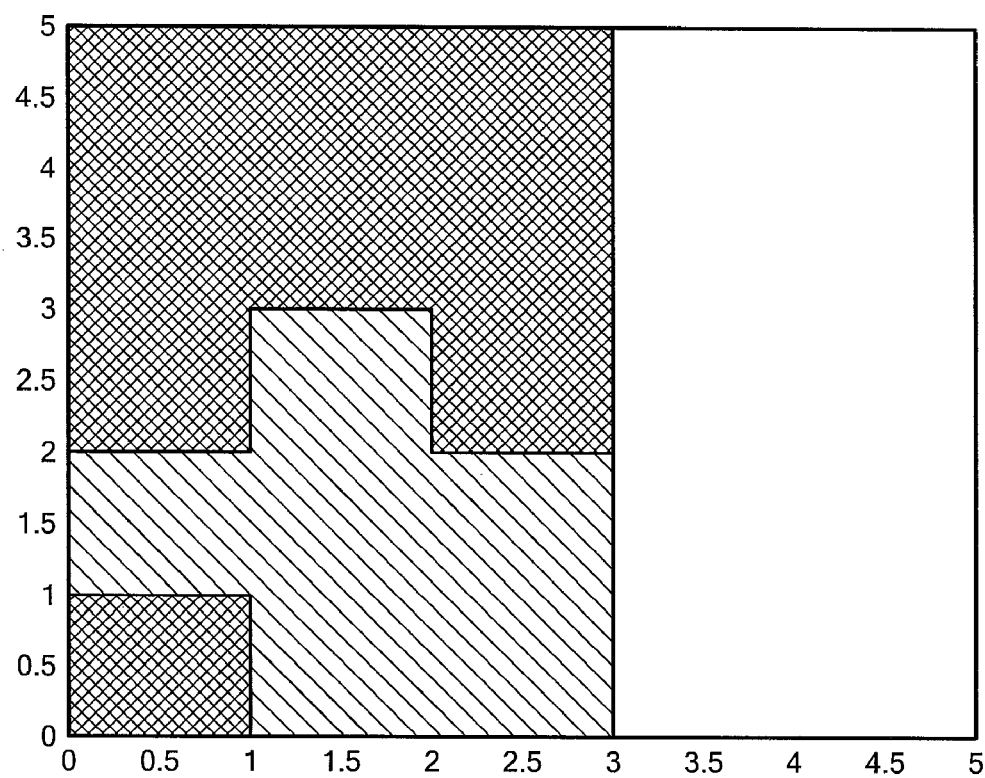

The last burst has size 26. There is a maximum bottom size of 10, which spans from (15,6) to (25,6). Using a bottom size of 10 results in a burst with height 3, with 4 unused slots. Testing a bottom size of 5 results in a burst with height 6, with 4 unused slots as well. However, the method cannot place the burst since it does not fit in the frame. Hence, the rectangle of width 10 and height 3 is chosen and placed at (15,6). The end result can be seen in FIG. 7C.

Both BL and LBP do not require the vertical strip at all. In fact, they perform very well without vertical strips (that is, the widths of all vertical strips are equal to 1). However, there is a restriction in LBP case. If the vertical strips are used for the burst allocation, LBP requires that all the strip sizes are identical. The BL method, on the other hand, does not have this restriction.

Best-Fit (BF)

The Best-Fit (BF) method allocates downlink bursts in a data region of a OFDMA data system, such data region having along a vertical axis thereof increasing logical sub channel numbers and along a bottom axis thereof increasing OFDMA symbol numbers. The best-fit method is a well-known method for the standard bin packing and strip packing problems, for example, see E. G. Coffman Jr., M. R. Garey, D. S. Johnson, and R. E. Tarj an, "Performance Bounds for Level-Oriented Two-Dimensional Packing Algorithms," SIAM J. Comput., Vol. 9, No. 4, November 1920, pp. 808-826. It is a 'level'-based approach, where rectangles are placed within horizontal strips (levels). Rectangles are appended to the 'best' level, where the definition of 'best' level depends on the specific method. New levels are created when rectangles cannot fit on previously created levels.

The best-fit method for the bin packing and strip packing problems cannot be used for the burst packing problem, because the rectangle sizes used in the burst packing problem are not given beforehand; they must be determined by the burst packing method. Here, the best-fit method is modified for the burst packing problem, and it consists of three stages to be described. One key difference between the best-fit method according to the invention and a standard best-fit method is that the best-fit method according to the invention works very well even if bursts are not sorted beforehand. The idea of leveling is to eliminate 'jagged edges' that may arise from using BL or LBP. The best-fit method, as noted above, includes three stages. The first stage creates levels and places the incoming bursts into the 'best' level, which may include creation of a new level. Once bursts cannot be placed in a level (existing or new), the method moves on to the second stage, where the levels are sorted in two manners. Finally, after sorting, a modified Aggressive Bottom Left method completes the packing. These methods are described in flowchart in FIGS. 10A, 10B and 10C. Furthermore, due to this leveling approach, it is unnecessary to use vertical strip sizes (or equivalently, all vertical strips have width 1). 'Levels' are horizontal strips, and their heights are determined dynamically based on the incoming bursts.

As noted above, method allocates bursts in three distinct stages:

The first stage of the BF method considers the placement of sub regions in a level-oriented manner. Levels are horizontal strips, numbered from bottom to top, whose heights are dynamically determined depending on the input bursts and their order. These levels define heights used for trial mappings for each burst. This method chooses the level, and hence the sub region, which minimizes the number of unused slots. Sub regions are placed in each level as leftmost as possible, without overlapping previously placed sub regions. If the minimum number of unused slots is shared between more than one level, then this method chooses the level which places the burst closest to the right-hand side of the data region. In case of further ties, this method chooses the level with the smallest height. A new level is created only if the number of unused slots is further reduced, and the smallest height for the level is chosen which yields the minimum number of unused slots.

If a burst cannot be placed in the above manner, then the first stage is completed and the second stage commences. The second stage of the BF method sorts each level such that bursts are arranged from left to right in the order of tallest to shortest. The levels are then resorted from bottom to top in the order of most-used width to least-used width. During the second stage, the placed bursts are resorted, and no new bursts are placed. After the sorting, the BF method continues to the third stage.

The third stage of the BF method places the remaining bursts, in order, with a variant of the BL method (called modified Aggressive BL). If possible, the burst is placed at the bottom-leftmost point that can fit the burst with the minimum number of unused slots. If the same bottom-leftmost point can accommodate the burst with different dimensions, the rectangle with the largest width is chosen.

More particularly, the BL method allocates bursts within a data region as follows:

1. Selects the first level (if it exists), otherwise goes to 4;
2. Determines trial mappings for this level, by calculating the required bottom length if the burst height is set to the level height, and also calculating the number of unused slots for this region;
3. The method moves on to the next level (if it exists) and returns to 2;
4. Determines at most one trial mapping for a new level, and calculates the number of unused slots, where the dimensions are determined such that the number of unused slots is minimized; if there are two or more sets of dimensions with the same unused slots, the method selects the dimensions with the smallest height and largest bottom length;
5. The method chooses the trial mapping with the least number of unused slots; if there are multiple trial mappings with the same number of unused slots, then the trial mapping of 4 is removed; if there are still multiple trial mappings with the same number of unused slots, then the trial mapping yielding the right-most placement of the burst is chosen; if there are still multiple trial mappings with the same number of unused slots, then the level with the smallest height is chosen; if there are still multiple trial mappings with the same number of unused slots, then any of these remaining levels may be chosen;
6. The method reduces the height of the chosen trial mapping while fixing the bottom length, if possible;
7. The method moves to the next burst and returns to 1; if the previous burst cannot be placed, then the method continues to 8;
8. The method sorts bursts within each level such that bursts are ordered from left to right in the order of non-increasing height;
9. The method sorts the levels from bottom to top in the order of non-increasing used width;
10. The method attempts the mapping of the failed burst from 7;
11. The method determines all possible placements for the burst, which can be done in a systematic manner by sequentially taking all unallocated slots as the bottom-left point and attempting packing for all possible bottom lengths, which may introduce gaps in the middle;
12. The method chooses the data region situated at the bottom-leftmost point which gives the smallest number of unused slots; if there are two or more data regions with the same number of unused slots at the same bottom-leftmost point, then the region with the larger bottom size is chosen;
13. The method moves to the next burst and returns to 11;
14. The method calculates the wasted (i.e., unused plus unallocated) slots.

As an example, 13 bursts of sizes 21, 30, 28, 22, 2, 31, 76, 5, 4, 19, 9, 43, and 25 are packed into a rectangle with width 30 and height 10. The final result is shown in FIGS. 11A-11M. Bursts 1 through 11 are packed using stage 1. Burst 12 failed to be packed during stage 1, and at this point, the layers were sorted. Burst 12 also failed to be packed using the modified aggressive BL method. Burst 13 was successfully placed, see FIGS. 11A-11M for the burst-by-burst placement.

Figure 11A:
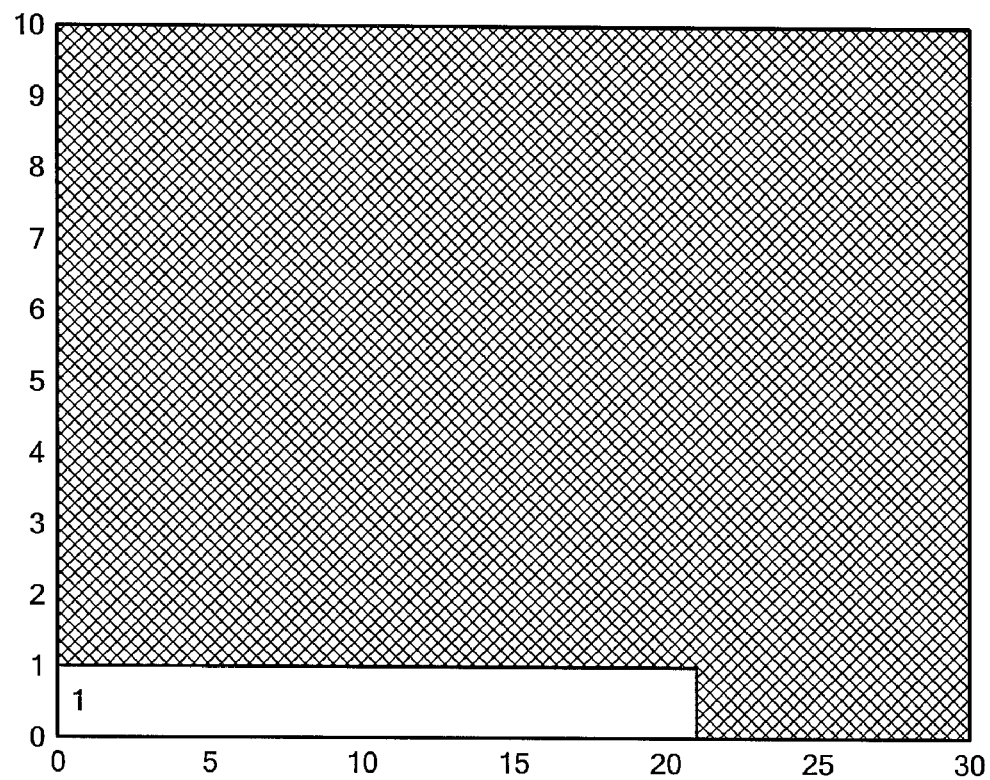
FIGS. 11A-11M are examples of the BF method of FIGS. 10A-10C.

Burst 1 (FIG. 11A)

Since no bursts have been placed, the first burst creates a new level. The location of the first burst of each level has its bottom-left corner affixed to the left side of the rectangle, on top of the topmost level. In this case, the bottom-left corner will be at (0,0). The dimensions of the rectangle are chosen identically to that in the aggressive BL method. That is, the widest bottom length yielding the minimum number of unused slots is chosen. The burst size is 21, so the dimensions of the rectangle are set to width 21 and height 1. This does not require any unused slots. Note that choosing the widest bottom length is equivalent to choosing the smallest level height.

Figure 11B:
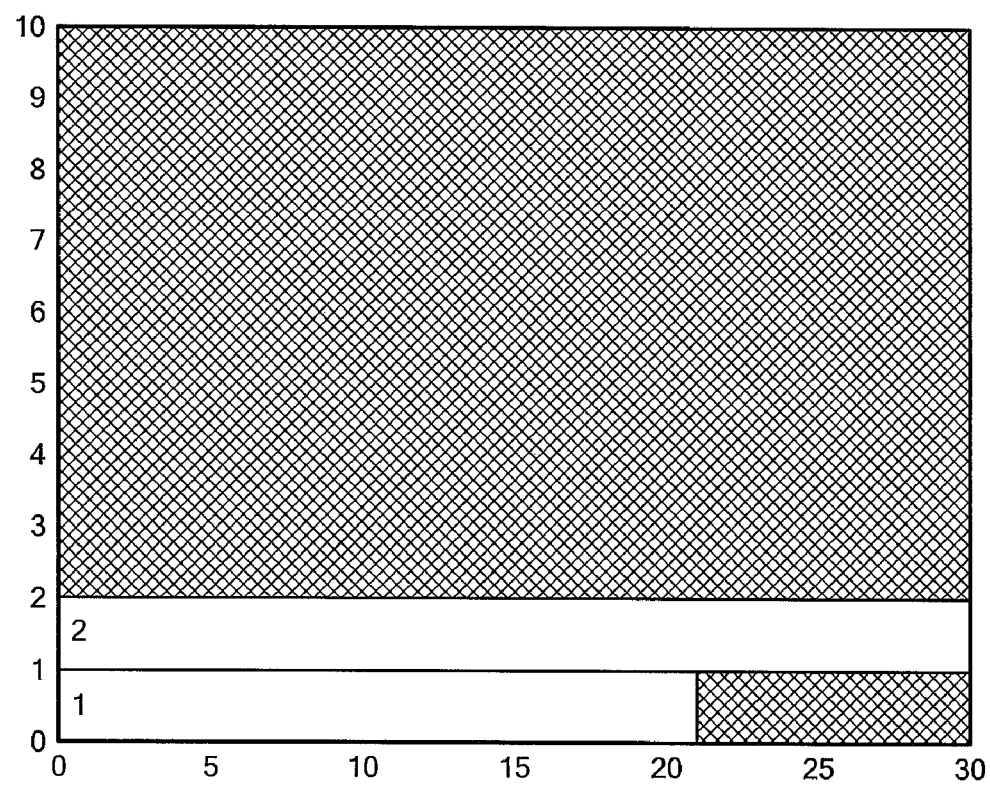

Burst 2 (FIG. 11B)

The second burst has size 30. First, the method attempts to pack it in existing levels. There is only one level, which has height 1. Placing the burst here would require a bottom size of 30, but there is not enough space (there are only 9 slots available). Thus the method cannot pack this burst into an existing level. The method then starts a second level, and the dimensions yielding the maximum base and minimum number of unused slots is a rectangle with width 30 and height 1. This also does not require any unused slots.

Figure 11C:
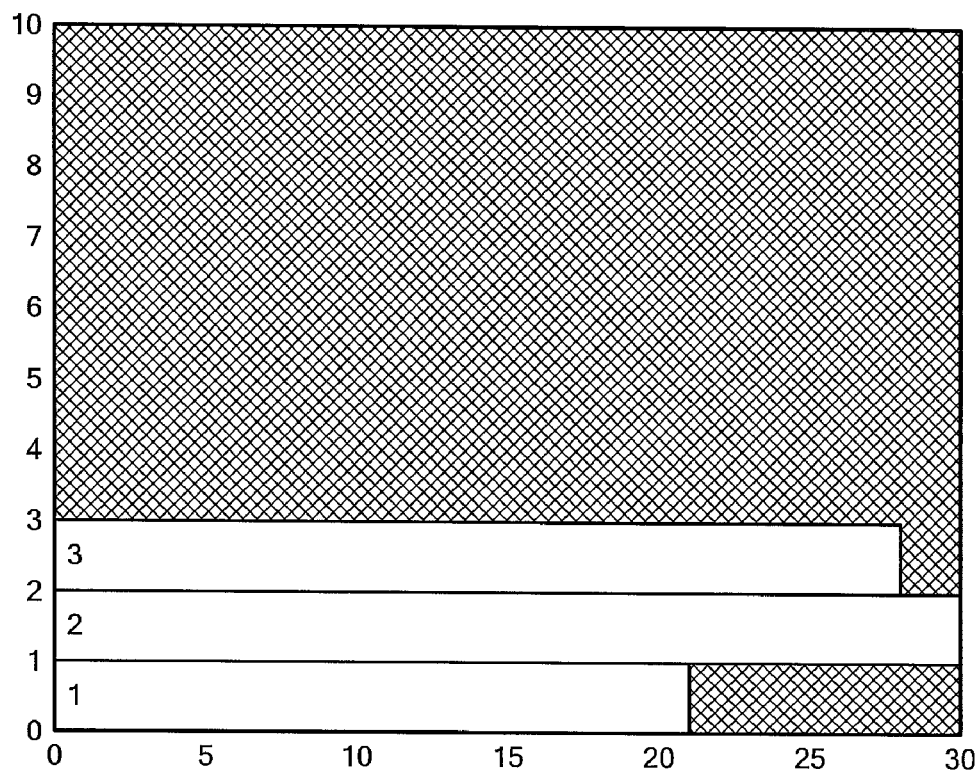

Burst 3 (FIG. 11C)

The third burst has a similar scenario to the second burst. It has size 28, which cannot fit in any existing level. Thus a third level is started, and the burst has width 28 and height 1.

Figure 11D:
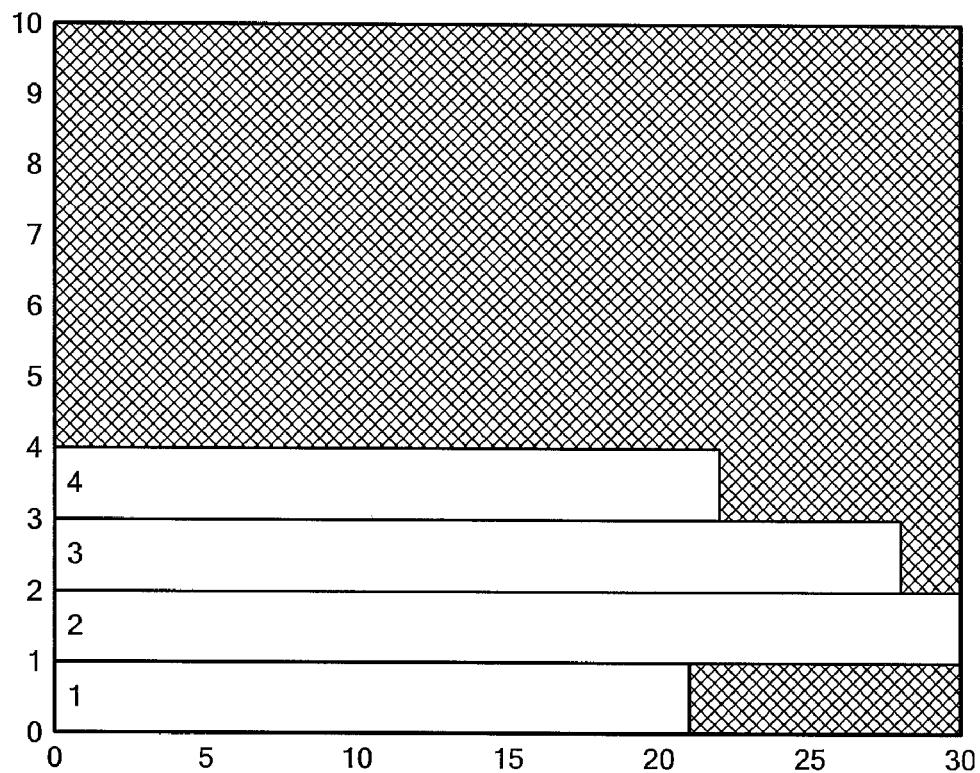

Burst 4 (FIG. 11D)

Likewise, the fourth burst is placed on a new layer, and this burst has width 22 and height 1.

Figure 11E:
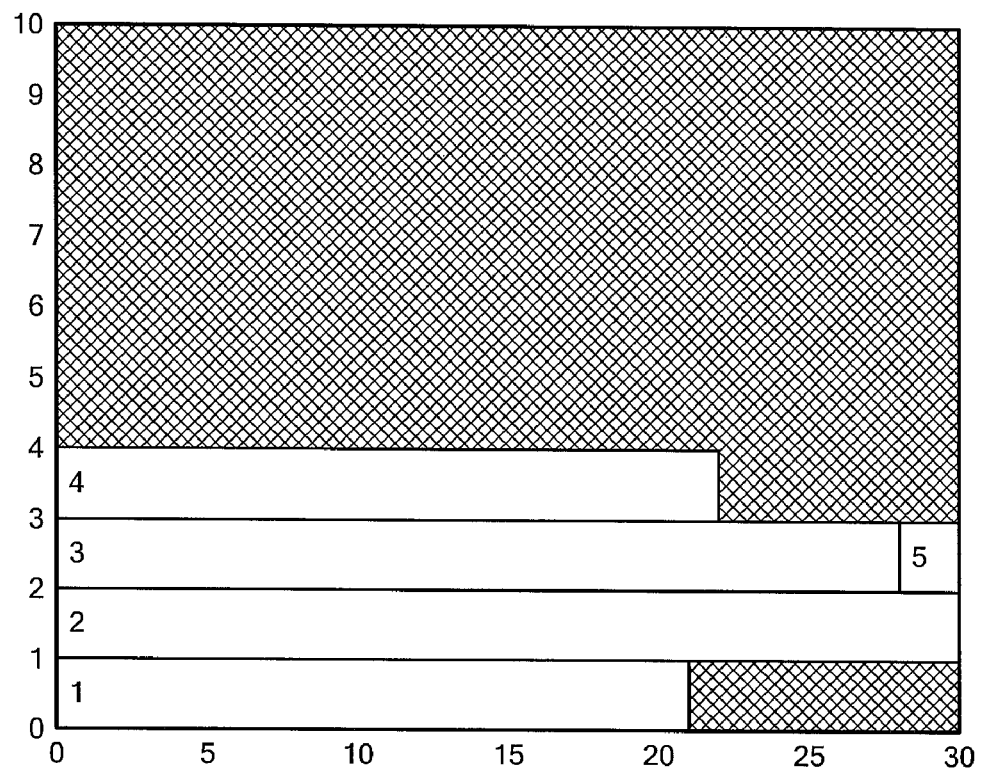

Burst 5 (FIG. 11E)

The fifth burst has size 2. Unlike the other four bursts, this burst can be placed in an existing level. Namely, it can be placed in the 1st, 3rd, and 4th level. However, the 'best' choice is given in the following order: minimum number of unused slots, rightmost placement, smallest level height. The best choice in this case is determined by the second criterion, since placement in each of the 3 levels would produce bursts with no unused slots. The method compares this position to the scenario if a new level is created. A new level is created IF the new level will yield (strictly) less unused slots than the level-placed burst. If a new level is created, it will be placed using a burst of width 2 and height 1. However, the number of unused slots is not reduced (it remains the same), so a new level is not created. Thus the fifth burst is placed on the 3rd level with a rectangle of width 2 and height 1.

Figure 11F:
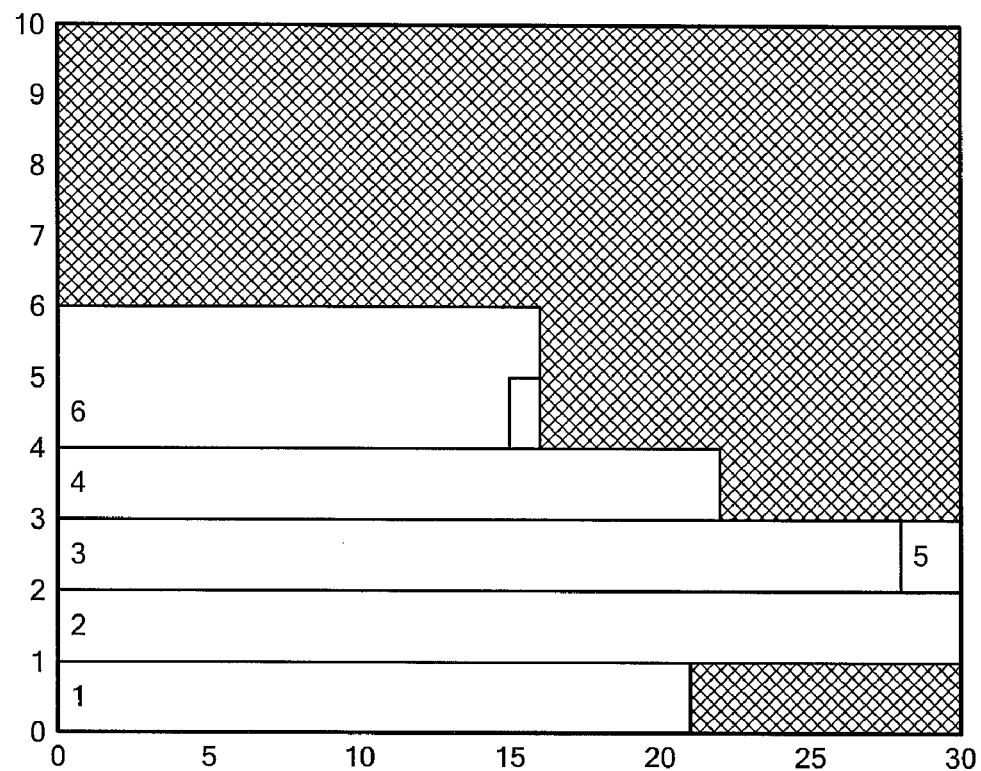

Burst 6 (FIG. 11F)

This burst has size 31. It cannot be placed in an existing level. Thus a new level is constructed. The minimum number of unused slots is 1, which occurs when the rectangle has width 16 and height 2.

Figure 11G:
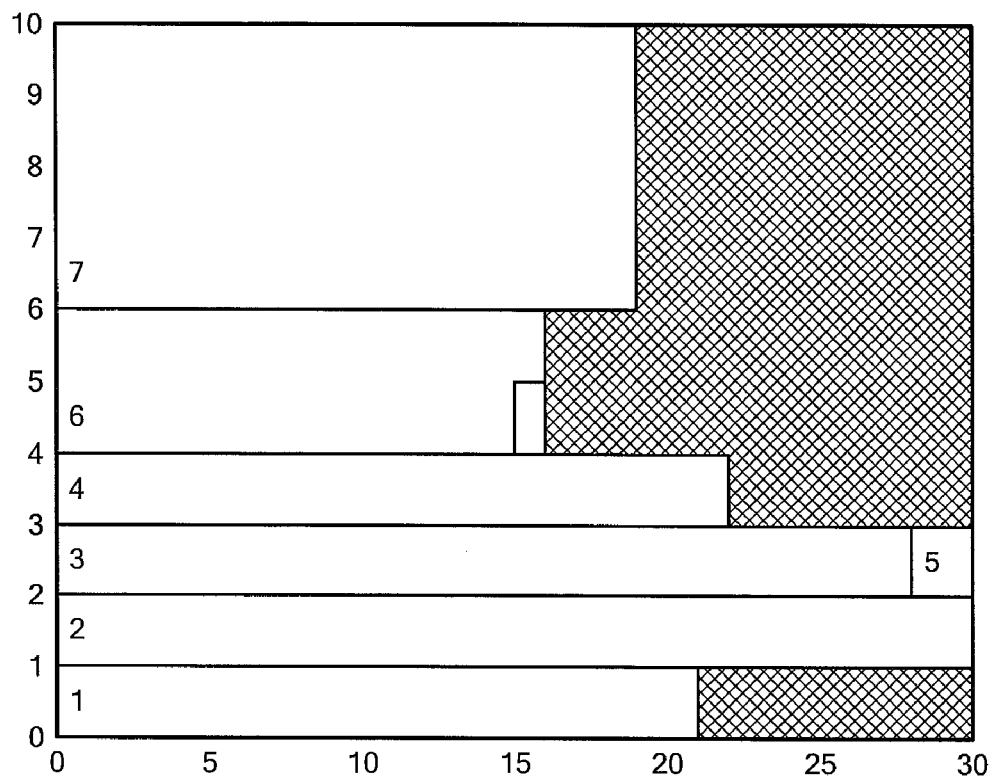

Burst 7 (FIG. 11G)

This burst has size 76. It cannot be placed in an existing level. It cannot fit on the 5th level (the level created by Burst 6), since that level can only accommodate a maximum area of 28. Thus a new level (the 6th level) is constructed. The minimum number of unused slots is 0, which occurs with rectangle with width 19 and height 4.

Figure 11H:
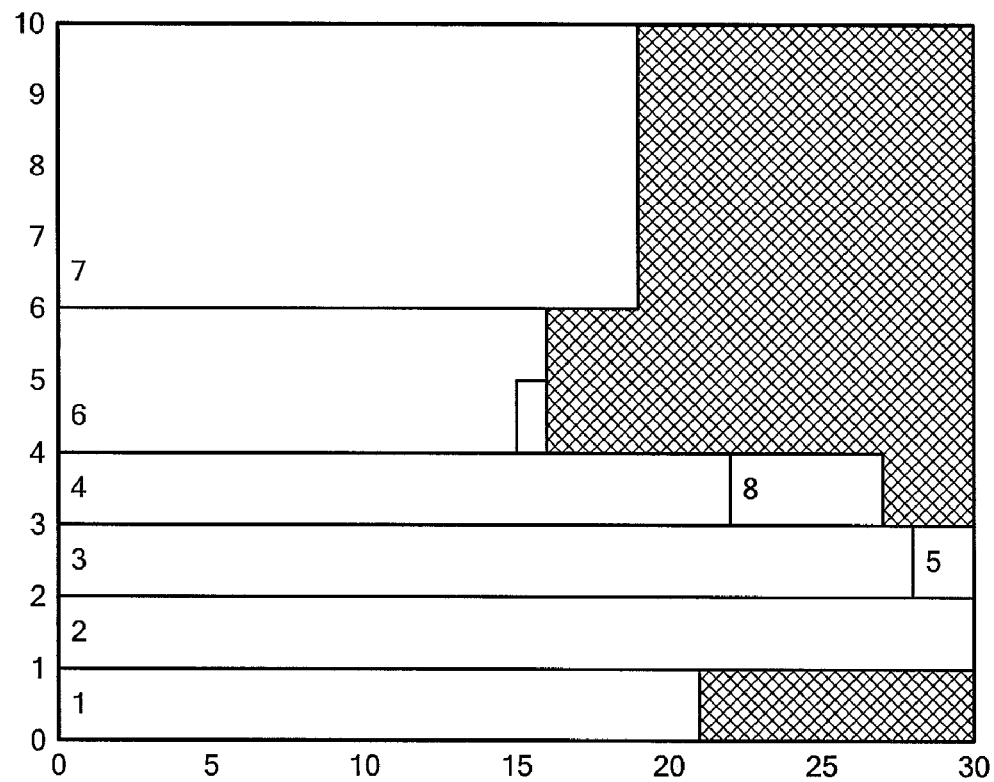

Burst 8 (FIG. 11H)

This burst has size 5. It can be placed on level 1, 4, 5, and 6. Level 6 has a height of 4, and this would yield 3 unused slots (since for this calculation the method is forcing the height to be the level's height, in this case, 4). Level 5 has a height of 2, and so placing the burst in this level will yield 1 unused slot. Levels 1 and 4 have heights of 1, and thus will yield no unused slots for this burst of size 5. Thus a tiebreaker must be used to determine which level (1 or 4) to place the burst. The winner in this case goes to level 4, which would yield the furthest-right placement. There is no more space to create a new level, so the method does not check to see whether a new level should be created.

Figure 11I:
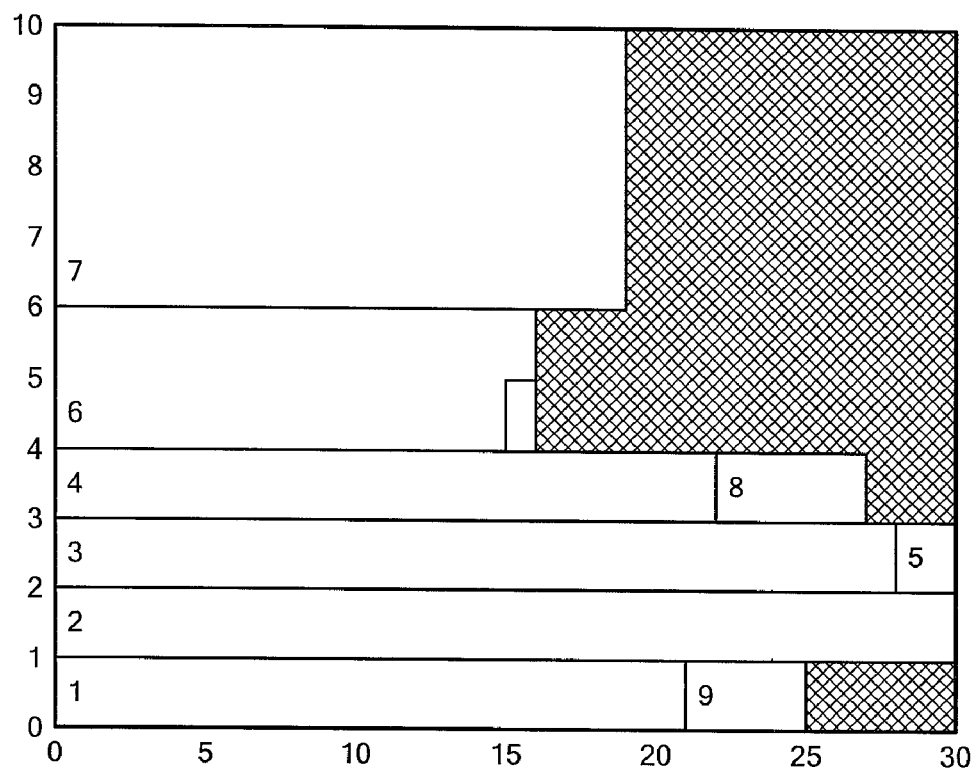

Burst 9 (FIG. 11I)

This burst has size 4. It can be placed on level 1, 5, and 6. Note that it does not fit on Level 4 because there is no space. Placing this burst in any of these levels will yield no unused slots, although the dimensions would differ. Of these three levels, the burst is placed on level 1 because it yields the placement that is furthest to the right.

Figure 11J:
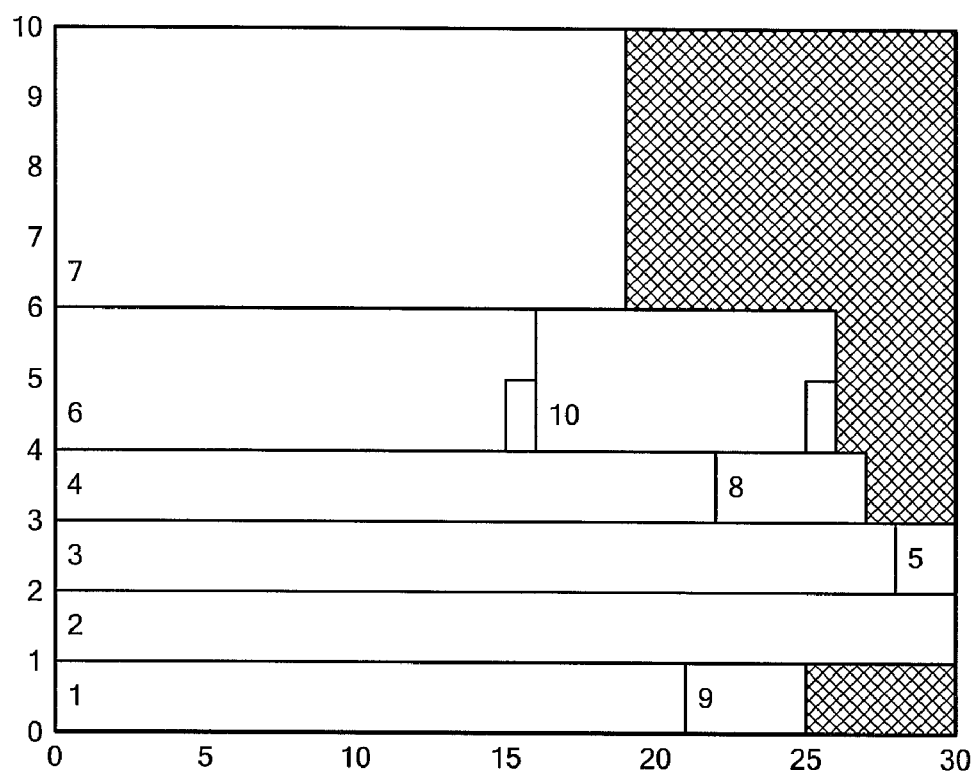

Burst 10 (FIG. 11J)

This burst has size 19. It can be placed on level 5 and 6. A placement on level 5 would yield a burst with width 10 and height 2, and 1 unused slot. A placement on level 6 would yield a burst with width 5 and height 4, and 1 unused slot. Since the number of unused slots was equal, the second tiebreaker is the burst with the rightmost placement. This goes to the 5th level; the burst will be placed from the 17th to the 26th slots inclusive. The placement on the 6th level would have been the 20th to the 24th slot inclusive.

Had this been a tie, the last tiebreaker would have been broken by the 5th level—it has a smaller height. There is no more space for another level. However, if there were space, the optimal placement would have been a rectangle of width 19 and height 1, which yields zero unused slots. Creation of a new_level would be preferable to a placement on an existing level due to the reduced number of unused slots, and indeed the method would create a new level if there was enough space.

Figure 11K:
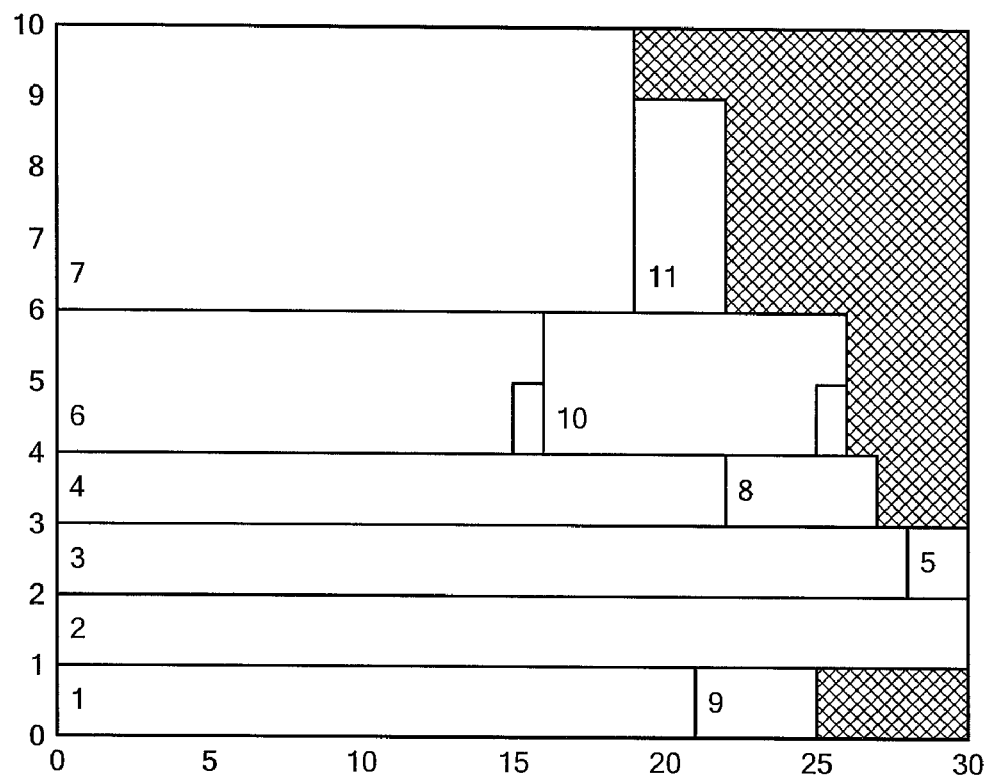

Burst 11 (FIG. 11K)

This burst has size 9. It can only fit on level 6. The method forces the height to be 4, which yields a rectangle with width 3 and height 4, and 3 unused slots. This value 3 would be the value used to compare the number of unused slots amongst different levels. The burst is placed on level 6, and the method then resizes the burst in the following manner. The method first calculates the minimum bottom length given the level height (3, as calculated before). Then, using this value, the method calculates the minimum height given this bottom length (in this case, the minimum height required is 3). This 3 by 3 rectangle is the resized burst. Note that even though the number of unused slots used in this resized burst is 0, this is not the value used in the comparison of trial mappings. Finally, this resizing procedure is performed during every block placement in Stage 1, but it had no effect for the previous bursts.

Figure 11L:
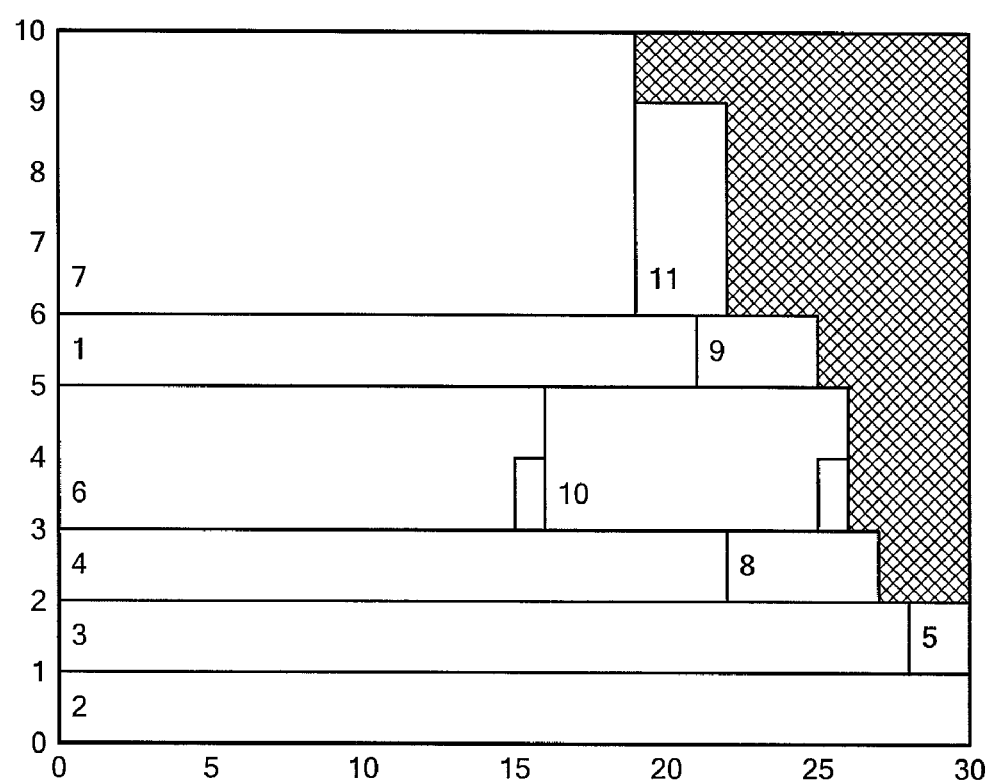
Figure 11M:
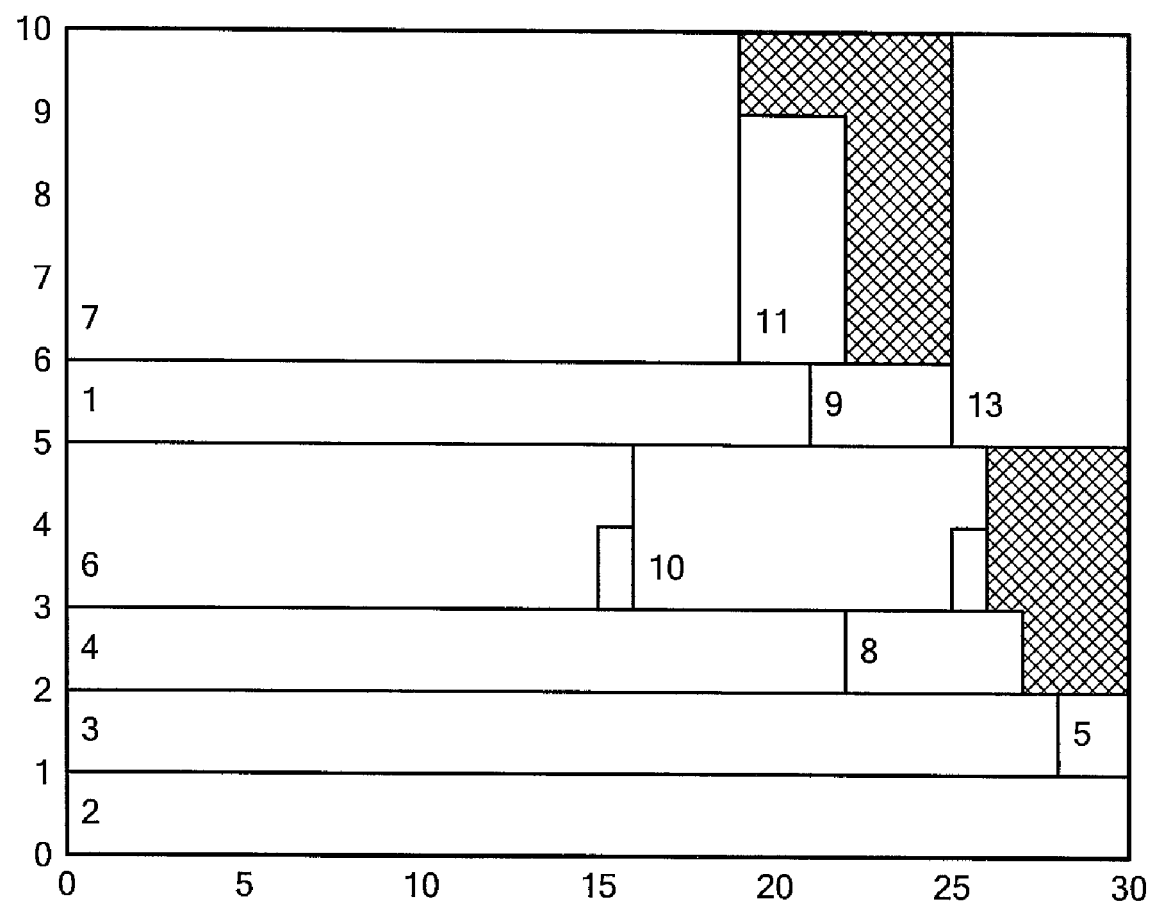

Stages 2 and 3 (for Bursts 12 and 13, FIGS. 11L and 11M)

The 12th burst has size 43. It cannot be placed on any existing level, and it cannot be placed in a new level. Thus Stage 2 begins: the sorting of levels. There are two sorting passes: horizontal sorting, and vertical sorting. First, each level is sorted horizontally from tallest height bursts (on the left) to smallest height bursts. This only affects resized bursts, such as burst 11—resized bursts have a smaller height than the level's height. In this particular example, none of the bursts change location. All blocks are resized to be placed along the bottom of the level. Thus, gaps are created (in non-decreasing order) from left to right, along the top. Second, the levels are sorted based on their used width. The end result can be seen in FIG. 11L. Levels with equal used width can be placed arbitrarily, and are grouped together. After sorting, stage 3 begins: the remaining bursts are packed using the modified Aggressive Bottom-Left method.

It is identical using the Aggressive Bottom-Left method presented earlier, except that the method does not terminate at the first bottom-left corner where a valid placement is found. Rather, the method continues searching across all bottom-left corners and places the block at the first location with minimum the number of unused slots, among all possible locations at all bottom-left corners, with secondary preference for larger bottom sizes. This modified method is shown in FIG. 10C. The expanded definitions of bottom size and bottom-left corners are used, as in the aggressive BL method. Note that in this FIG. 10C, the burst bottom size is decreasing instead of increasing, and that there is no equality in the comparison of current number of unused slots with the best number of unused slots. This effectively chooses the burst with the widest base and the smallest number of unused slots, at the first BL point (taken over all BL points). Compare this to FIG. 4, where the burst bottom size is increasing, and the comparison is not a strict inequality: the BL method chooses the burst with the widest base and the smallest number of unused slots, at the first BL point where a valid placement exists.

Burst 12 could not be placed during Stage 3. However, burst 13 can be placed. It is placed with a rectangle of width 5 and height 5 because that placement is the first placement that yields the minimum number of unused slots. Note that it could fit in a lower bottom-left corner, namely at (26,3) with a rectangle of width 4 and height 7, but this yields 3 unused slots. The normal Aggressive BL method would have placed this burst at (26,3), but this modified Aggressive BL method places it at (25,5).

Motivation for Procedures

Packing via the concept of levels is simple and effective in standard bin and strip packing problems. The method extends this concept for the burst-packing problem where dimensions are flexible and not fixed. The level method itself is used during Stage 1, where a manner of determining the 'best level' has been identified, which consists of the three tie breaking criteria, as well as a decision whether to create a new level. The first tiebreaking criterion (minimum number of unused slots) was chosen since the goal of packing is to reduce wasted space. The second criterion (right-most packing) and the third criterion (smallest height) were chosen to keep the largest regions of unallocated space for packing while having some preference to use larger-height levels.

The purpose of Stage 2 is to collect the unallocated slots together in preparation for Stage 3. Conceptually, even if a burst cannot be placed in an existing level, it may be placed in unallocated space (spread across levels). By sorting, the method is effectively combining unallocated slots together to form a large contiguous (and generally non-rectangular) region.

The third stage is to opportunistically pack the remaining bursts given this large region of unallocated space.

Depending on application, stages 2 and 3 can be dropped due to the time complexity. In this case, the method would continue the packing in levels regardless if a burst fails to be placed in this procedure.

Each one of these stages can be modified. For example, the 'best level' criteria can change. The sorting method can be modified to further increase the region of unallocated slots. Also, depending on application, modifying the sorting method may be required to ensure that certain levels do not change positions. For example, in a WiMAX frame, the first OFDMA symbols must contain the FCH, DL-MAP, UL-MAP, and these cannot be placed anywhere else in the frame. Thus the levels corresponding to these fixed bursts must not be swapped or sorted. The third stage can be changed as well.

Figure 10A:
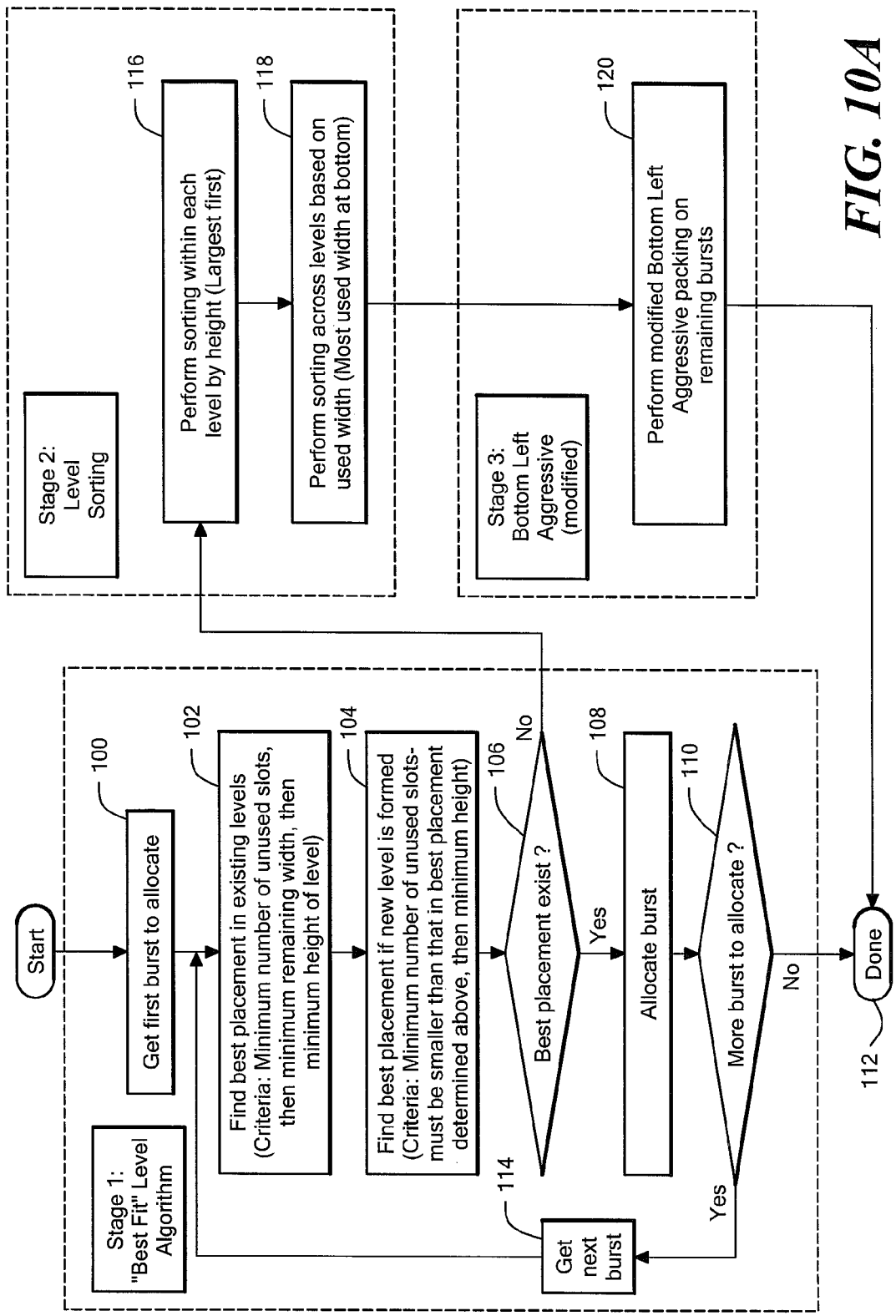
FIGS. 10A-10C are flow charts of best fit (BF) method according to the invention.

An overall flow chart of the best-fit method is shown in FIG. 10A. The best-fit method begins in stage 1, an expanded flowchart of stage 1 being shown in FIG. 10B. Thus, as shown in FIG. 10A, the method selects the first burst for allocation, Step 100. Next, the method determines the best placement in existing levels using as criteria the minimum number of unused slots then remaining width, then minimum height, Step 102, the details being described in connection with Steps 202-220 of the flowchart in FIG. 10B. Next, if possible, the method finds the best placement if a new level is formed using as criteria a minimum number of unused slots (provided that the number of unused slots is smaller than that determined in Step 102), then minimum height, Step 104, the details being described in connection with Steps 222-234 of the flowchart in FIG. 10B. Any best placement formed by a new level according to the aforementioned criteria usurps the best placement formed within existing levels. If a best placement exists, Step 106, the method allocates the burst in a specific manner, Step 108, where the burst has width as defined by burst_bottom_size as determined by the best placement, and where the height is recalculated as ceil(size/burst_bottom_size), in other words the smallest integer greater than or equal to size/burst_bottom_size. It should be noted that the recalculated height may differ from burst_height as determined by the best placement. The method then determines whether there are more bursts to allocate, Step 110. If there are no further bursts to allocate, the allocation method terminates, Step 112. On the other hand, if there are more bursts to allocate, the method obtains the next burst, Step 114 and the method returns to Step 102. This completes Stage 1.

If, the other hand, in Step 106 no best placement existed, that is, no best placement was found in Steps 102 and 104, the method proceeds to Stage 2, and performs level sorting described in detail in FIG. 10C. Suffice it to say here that in stage 2 the method performs sorting within each level by height using the largest height first, Step 116. Next, the method performs sorting across levels based on used width with the largest used width being at the bottom, Step 118 thereby completes stage 2. Next the method enters stage 3 using the modified Bottom left Aggressive method on remaining bursts, Step 120, described in more detail in FIG. 10C.

Figure 10B:
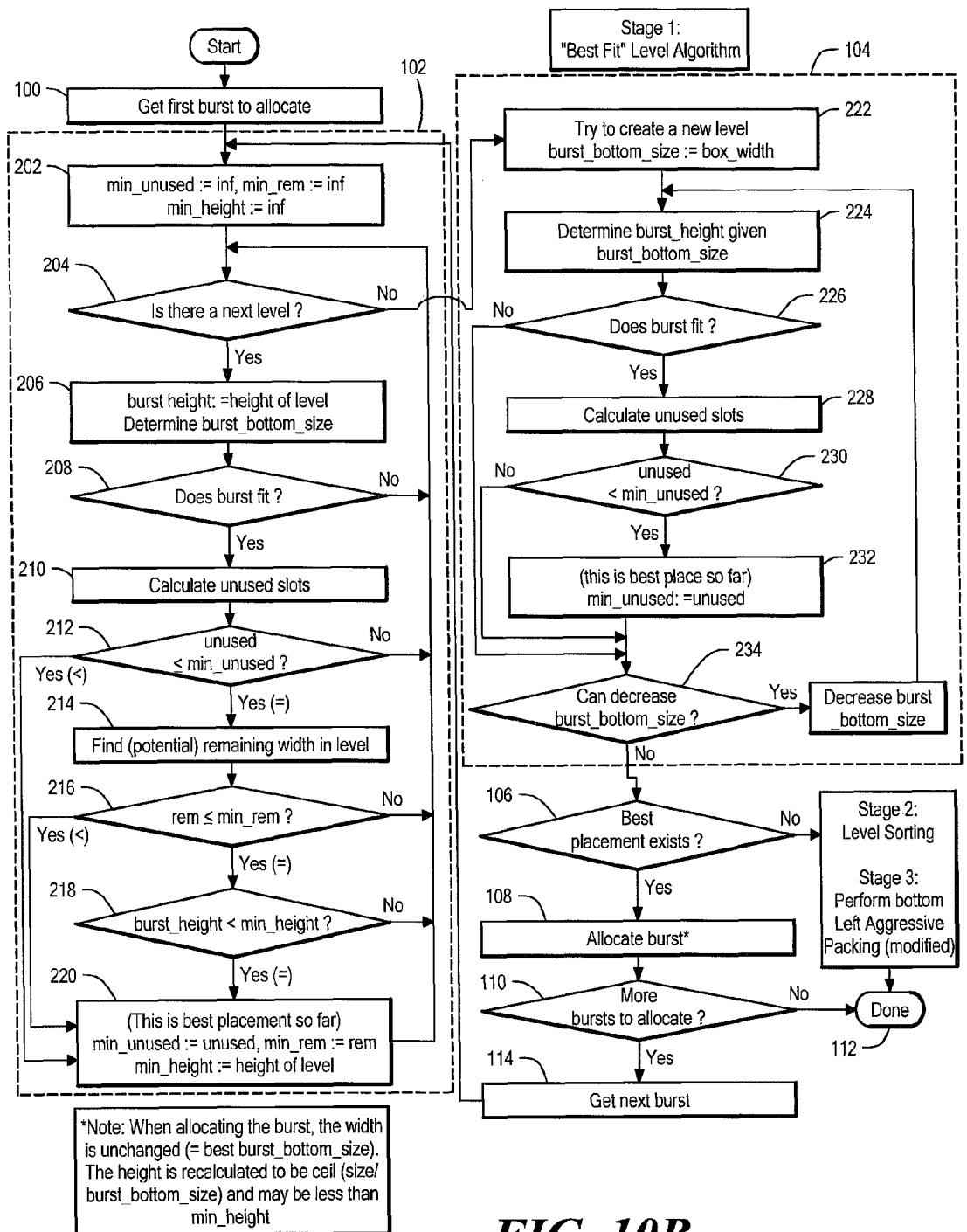
Figure 10C:
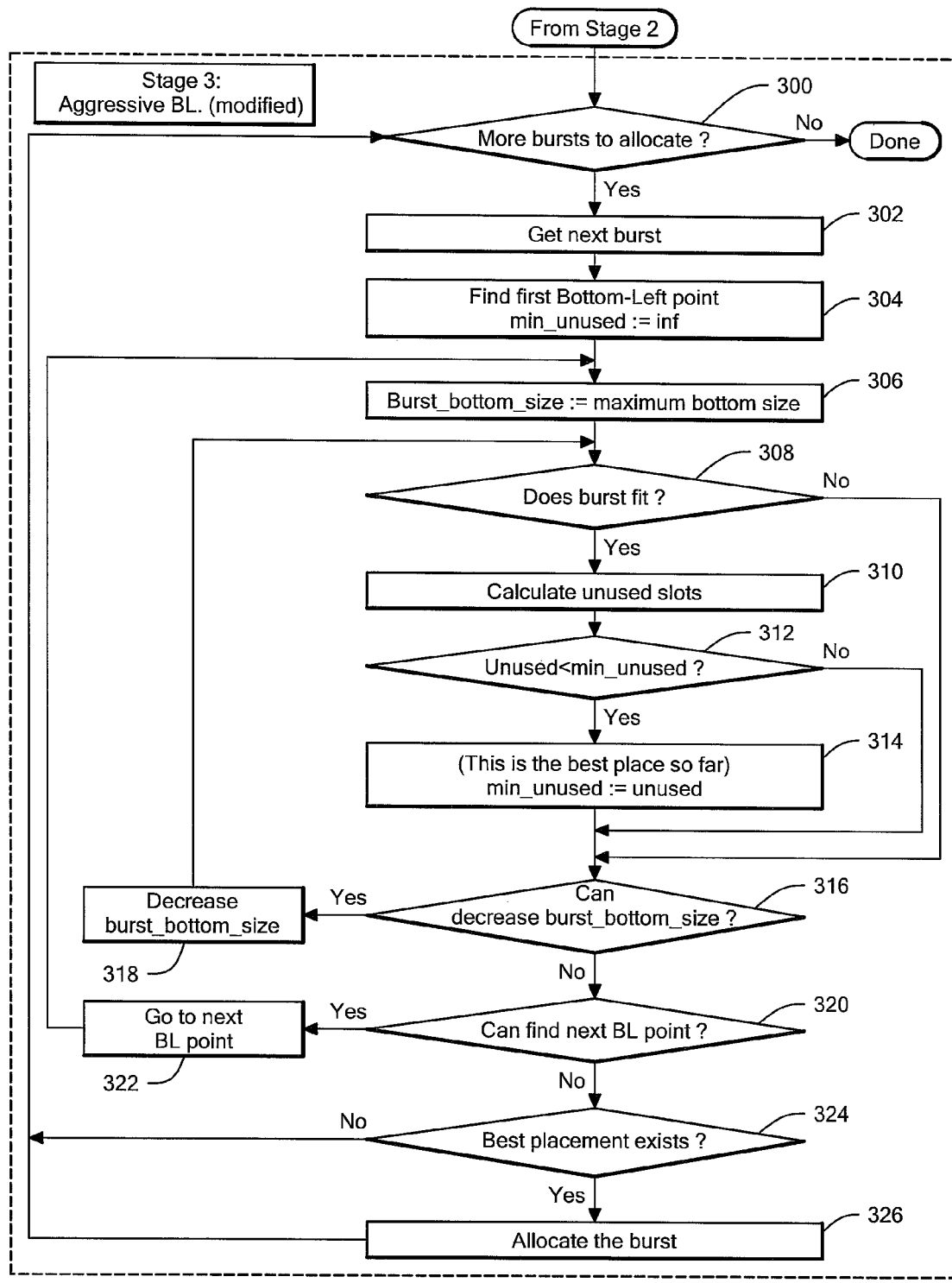

Referring now to FIG. 10B, a more detailed flowchart of stage 1 is shown. As shown therein, the method obtains the first burst to allocate, Step 100. Next, the method sets min_unused:=infinity; min_height:=infinity; and, min_rem:=infinity, Step 202. The method starts at the bottom of the data region. Next, the method proceeds to the next level in bottom-to-top order, if it exists, Step 204. Initially, this is the first level, or the most-bottom level. If there is a next level, the method sets burst_height:=height of level and determines burst_bottom_size by calculating ceil(size/burst_height), in other words the smallest integer greater than or equal to size/burst_height, Step 206. Next, the method determines whether the burst fits, Step 208, by determining if burst_bottom_size does not exceed the available remaining width in the level. If it does fit, the method calculates the number of unused slots, Step 210, by subtracting size from the product of burst_height and burst_bottom_size. Next, the method determines whether unused is less than, equal to min_unused or greater than min_unused, Step 212. If unused is equal to min_unused, the method determines potential remaining width, rem, in the level, Step 214, by subtracting burst_bottom_size from the available remaining width in the level. Next, the method determines whether rem is less than, or equal to, or greater than min_rem, Step 216. If rem is equal to min_rem, the method determines whether burst_height is less than min_height, Step 218. If burst_height is less than min_height, the method decides that this is the best placement so far and sets min_unused:=unused; min_height:=height of level; and, min_rem:=rem, Step 220 and the method returns to Step 204.

On the other hand, if in Step 212, the method determines that unused is less than min_unused, the method proceeds directly to Step 220 while if in Step 212, the method determines that unused is greater than min_unused, the method returns to Step 204.

On the other hand, if in Step 216, the method determines that rem is less than min_rem, the method proceeds directly to Step 220 while if in Step 216, the method determines that rem is greater than min_rem, the method returns to Step 204.

If in Step 218 the method determines that burst_height is not less than min_height, the method returns to Step 204.

If in Step 204, the method determines that there is no next level, the method performs Step 104 (FIG. 10A). More particularly, the method tries to create a new level; burst_bottom_size=box_width, Step 222. Next, the method determines burst_height given Burst_bottom_size, Step 224, by calculating ceil(size/burst_bottom_size), in other words the smallest integer greater than or equal to size/burst_bottom_size. Next, the method determines whether the burst fits, Step 226, by determining if burst_height does not exceed the available height separating the most-top level and the top of the data region. If it does fit, the method calculates the number of unused slots, Step 228, by subtracting size from the product of burst_height and burst_bottom_size. Next, then method determines whether the number of unused slots is less than min_unused, Step 230. If the number of unused slots is less than min_unused, the method decides that this is the best placement so far and sets min_unused:=unused, Step 232. Next, the method determines whether burst_bottom_size can be decreased by 1 and remain positive, Step 234. If it cannot be decreased (it cannot be decreased by 1 and remain positive), the method proceeds to Step 106 described above; otherwise, the method decreases burst_bottom_size by 1 and returns to Step 224.

If in Step 226, the method determines that the burst does not fit, the method proceeds directly to Step 234.

If in Step 230 determines that unused is not less than min_unused, the method proceeds directly to Step 234.

Referring now to FIG. 10C, a more detailed flowchart of stage 3 (modified Aggressive BL) is shown. In Step 300, the method determines whether there are more bursts to allocate. If not, the method ends. On the other hand, if there are more bursts to allocate, the method obtains the next burst, Step 302. Next, the method finds the first bottom left point and sets min_unused:=infinity, Step 304. Next, the method sets burst_bottom_size=maximum bottom size, Step 306. Next, the method determines whether the burst fits by determining if the sub region defined by the bottom left point and the burst dimensions burst_bottom_size by burst_height is within the data region boundaries and currently unallocated, where burst_height is calculated as ceil(size/burst_bottom_size), in other words the smallest integer greater than or equal to size/burst_height, Step 308. If the burst fits, the method calculates the number of unused slots, Step 310. Next, the method determines whether the number of unused slots is less than min_unused, Step 312. If the number of unused slots is less than min_unused, the method decides that this is the best placement so far and sets min_unused:=unused, Step 314. Next, the method determines whether burst_bottom_size can be decreased, Step 316, in a manner identical to Step 234. If it can be decreased, the method decreases the burst_bottom_size, Step 318 and the method returns to Step 308; on the other hand, if it cannot be decreased, the method determines whether it can find a next bottom left point, Step 320. If it can, the method goes to the next bottom left point, Step 322, and returns to Step 306; on the other hand, if the method cannot find a next bottom left point, the method determines whether a best placement has been defined, Step 324, where the best placement is defined by the last recurrence (if any) of Step 314. If a best placement exists, the method allocates the burst as defined by the best placement (no height resizing is required), Step 326 and returns to Step 300; on the other hand, if the method determines that no best placement has been defined, the method returns to Step 300.

If in Step 308 the method determined that the burst does not fit, the method proceeds directly to Step 316. Further, if in Step 310 the method determines that unused is not less than min_unused, the method proceeds directly to Step 316.

CONCLUSION

The Bottom-Left method creates and locates the data region with the minimum number of unused slots at the bottom left point. The Large-Bottom-Priority method prefers the data region with the larger bottom size if it generates the minimum number of unused slots. The Best-Fit method attempts to pack bursts in horizontal strips or levels, proceeds to sort the levels, and continues packing according to a variant of the Bottom-Left method. All three methods can handle any order of incoming bursts of any size.

A number of embodiments of the invention have been described. Nevertheless, it will be understood that various modifications may be made without departing from the spirit and scope of the invention. Accordingly, other embodiments are within the scope of the following claims.

What is claimed is:

1. A method for allocating rectangles whose dimensions are drawn from a discrete set into a region where only the minimum requirement for the areas of rectangles are given, comprising:

performing, by an Orthogonal Frequency Division Multiple Access (OFDMA) system, for each one of the given required areas, a series of trial mappings and determining the number of unused space for each one of the trial mappings;

mapping, for each one of the given required areas, a selected one of the trial mappings with the minimum number of unused spaces into an unallocated portion of the region; and packing by choosing a location at a first corner of the region, attempting to place the rectangle for a given required area using different sizes along one axis of the region, and choosing the largest one of the sizes resulting in the minimum number of unused space, wherein the region is rectangular and is partitioned into strips where each one of the strips has a predetermined width, and where the width of allocated rectangles span the entire combined width of one or more contiguous strips.

2. The method recited in claim 1 wherein if no placement at a given corner is possible because no valid trial mappings exist, the packing proceeds to another corner of the region.

3. A method for allocating rectangles whose dimensions are drawn from a discrete set into a region where only the minimum requirement for the areas of rectangles are given, comprising:

performing, by an Orthogonal Frequency Division Multiple Access (OFDMA) system, for each one of the given required areas, a series of trial mappings and determining the number of unused space for each one of the trial mappings;

mapping, for each one of the given required areas, a selected one of the trial mappings with the minimum number of unused spaces into an unallocated portion of the region; and packing by choosing a first size along an axis of the region in which the rectangle for a given required area of that first size has at least one valid placement in the region, wherein the region is rectangular and is partitioned into strips where each one of the strips has a predetermined width, and where the width of allocated rectangles span the entire combined width of one or more contiguous strips.

4. The method recited in claim 3 including packing by choosing dimensions of the rectangle for a given required area, from largest size along a first axis to smallest size along the first axis, where the trial mapping is placed in the narrowest possible region, and terminating the trial mappings at the first occurrence when the number of used space increases with a smaller length along the first axis.

5. The method recited in claim 4 wherein the trial mappings selection is in accordance with the minimum number of unused space.

6. A method for allocating rectangles whose dimensions are drawn from a discrete set into a region where only the minimum requirement for the areas of rectangles are given, comprising:

performing, by an Orthogonal Frequency Division Multiple Access (OFDMA) system, for each one of the given required areas, a series of trial mappings and determining the number of unused space for each one of the trial mappings; and mapping, for each one of the given required areas, a selected one of the trial mappings with the minimum number of unused spaces into an unallocated portion of the region, wherein the region is rectangular, and wherein when there are two or more trial mappings resulting in an equal number of minimum number of unused space, the method maps the rectangle for a given required area across one of the trial mappings minimizing the remaining width within an existing level.

7. The method recited in claim 6 wherein when there are two or more trial mappings resulting in the minimum amount of remaining width in the level, the method maps the rectangle for a given required area across one of the trial mappings with the least level height.

8. The method recited in claim 7 wherein the chosen mapping is further modified by fixing the size along a width dimension and reducing the size along a height dimension if possible.

9. The method recited in claim 8 wherein when the current given required area has no potential trial mappings within any level, the method rearranges all previously-placed trial mappings by sorting the trial mappings within each level of the region in accordance with changes in height within the levels, and then sorting the trial mappings between levels of the region in accordance with the amount of used width by each level.

10. The method recited in claim 9 wherein the method performs trial allocations of the remaining given required areas in accordance with the result of the sortings, and selecting, for each one of the remaining given required area, one of the potential trial allocations resulting in the minimum number of unused space.

11. A method for allocating downlink bursts into a data region of an OFDMA data system, such data region having along one axis thereof increasing logical sub channel numbers and along another axis thereof increasing OFDMA symbol numbers, where such data region is a rectangular array of minimal resource allocation units called slots and the required allocation for each burst is specified in terms of slots, comprising:

performing, by an Orthogonal Frequency Division Multiple Access (OFDMA) system, for each one of the bursts, a series of trial mappings and determining the number of unused slots for each one of the trial mappings;

mapping, for each one of the bursts, a selected one of the trial mappings with the minimum number of unused slots into an unallocated portion of the region; and constructing strips in the region, attempting to place a burst within existing strips or by creating a new strip, and choosing the trial mapping resulting in the minimum number of unused slots.

12. The method recited in claim 11 wherein when there are two or more trial mappings resulting in an equal number of minimum number of unused slots, the method maps the burst across one of the trial mappings minimizing the remaining width within an existing level.

13. The method recited in claim 12 wherein when there are two or more trial mappings resulting in the minimum amount of remaining width in the level, the method maps the burst across one of the trial mappings with the least level height.

14. The method recited in claim 13 wherein the chosen mapping is further modified by fixing the size along a width dimension and reducing the size along a height dimension if possible.

15. The method recited in claim 14 wherein when the current burst has no potential trial mappings within any level, the method rearranges all previously-placed trial mappings by sorting the trial mappings within each level of the region in accordance with changes in height within the levels, and then sorting the trial mappings between levels of the region in accordance with the amount of used width by each level.

16. The method recited in claim 15 wherein the method performs trial allocations of the remaining bursts in accordance with the result of the sortings, and selecting, for each one of the remaining bursts, a potential trial mapping resulting in the minimum number of unused slots.

17. A method for allocating bursts into a region, comprising:

performing, by an Orthogonal Frequency Division Multiple Access (OFDMA) system, for each one of the bursts, a series of trial mappings and determining the number of unused slots for each one of the trial mappings;

mapping, for each one of the bursts, a selected one of the trial mappings with the minimum number of unused slots into an unallocated portion of the region; and packing by choosing a location at a first corner of the region, attempting to place a burst using different sizes along one axis of the region, and choosing the largest one of the sizes resulting in the minimum number of unused slots, wherein the region is rectangular and the region is partitioned into strips where each one of the strips has a predetermined width, and where the width of allocated rectangles span the entire combined width of one or more contiguous strips.

18. The method recited in claim 17 wherein if no placement at a given corner is possible because no valid trial mappings exist, the packing proceeds to another corner of the region.

19. The method recited in claim 17, wherein:
the allocated bursts are downlink bursts, and
the region is a data region of an OFDMA data system, such data region having along one axis thereof increasing logical sub channel numbers and along another axis thereof increasing OFDMA symbol numbers, where such data region is a rectangular array of minimal resource allocation units called slots and the required allocation for each burst is specified in terms of slots.

20. The method recited in claim 19, wherein the allocated rectangles are allocated rectangular sub regions.

21. A method for allocating bursts into a region, comprising:
performing, by an Orthogonal Frequency Division Multiple Access (OFDMA) system, for each one of the bursts, a series of trial mappings and determining the number of unused slots for each one of the trial mappings;
mapping, for each one of the burst, a selected one of the trial mappings with the minimum number of unused slots into an unallocated portion of the region; and
packing by choosing a first size along an axis of the region in which the burst of that first size has at least one valid placement in the region,
wherein the region is rectangular and the region is partitioned into strips where each one of the strips has a predetermined width, and where the width of allocated rectangles span the entire combined width of one or more contiguous strips.

22. The method recited in claim 21 including packing by choosing dimensions of the burst, from largest size along the first axis to smallest size along the first axis, where the trial mapping is placed in the narrowest possible region, and terminating the trial mappings at the first occurrence when the number of used space increases with a smaller length along the first axis.

23. The method recited in claim 22 wherein the trial mappings selection is in accordance with the minimum number of unused slots.

24. The method recited in claim 21, wherein:
the allocated bursts are downlink bursts, and
the region is a data region of an OFDMA data system, such data region having along one axis thereof increasing logical sub channel numbers and along another axis thereof increasing OFDMA symbol numbers, where such data region is a rectangular array of minimal resource allocation units called slots and the required allocation for each burst is specified in terms of slots.

25. The method recited in claim 24, wherein the allocated rectangles are allocated rectangular sub regions.

26. A method for allocating bursts into a region, comprising:
performing, by an Orthogonal Frequency Division Multiple Access (OFDMA) system, for each one of the bursts, a series of trial mappings and determining the number of unused slots for each one of the trial mappings;
mapping, for each one of the bursts, a selected one of the trial mappings with the minimum number of unused slots into an unallocated portion of the region; and
constructing strips in the region, attempting to place a burst within existing strips or by creating a new strip, and choosing the trial mapping resulting in the minimum number of unused slots,
wherein the region is rectangular, and
wherein when there are two or more trial mappings resulting in an equal number of minimum number of unused slots, the method maps the burst across one of the trial mappings minimizing the remaining width within an existing level.

27. The method recited in claim 26 wherein when there are more than one trial mappings resulting in the minimum amount of remaining width in the level, the method maps the burst across one of the trial mappings with the least level height.

28. The method recited in claim 27 wherein the chosen mapping is further modified by fixing the size along the width dimension and reducing the size along the height dimension if possible.

29. The method recited in claim 28 wherein when the current burst has no potential trial mappings within any level, the method rearranges all previously-placed trial mappings by sorting the trial mappings within each level of the region in accordance with changes in height within the levels, and then sorting the trial mappings between levels of the region in accordance with the amount of used width by each level.

30. The method recited in claim 29 wherein the method performs trial allocations of the remaining bursts in accordance with the result of the sortings, and selecting, for each one of the remaining bursts, a potential trial mapping resulting in the minimum number of unused slots.

* * * * *